US011255692B2

(12) United States Patent
Zhang et al.

(10) Patent No.: US 11,255,692 B2
(45) Date of Patent: Feb. 22, 2022

(54) SYSTEM AND METHOD FOR IDENTIFICATION OF A ROADWORK ZONE

(71) Applicant: HERE GLOBAL B.V., Eindhoven (NL)

(72) Inventors: Zhenhua Zhang, Chicago, IL (US); Leon Stenneth, Chicago, IL (US); Ram Marappan, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 309 days.

(21) Appl. No.: 16/358,367

(22) Filed: Mar. 19, 2019

(65) Prior Publication Data

US 2020/0300658 A1    Sep. 24, 2020

(51) Int. Cl.
*G01C 21/36*    (2006.01)
*G01C 21/30*    (2006.01)
(Continued)

(52) U.S. Cl.
CPC ......... *G01C 21/3691* (2013.01); *G01C 21/30* (2013.01); *G01C 21/3697* (2013.01);
(Continued)

(58) Field of Classification Search
CPC ............ G01C 21/3453; G01C 21/3461; G01C 21/3484; G01C 21/3492; G01C 21/26;
(Continued)

(56) References Cited

U.S. PATENT DOCUMENTS 9,195,914 B2    11/2015   Fairfield et al.
9,965,950 B2     5/2018   Xu et al.
(Continued)

FOREIGN PATENT DOCUMENTS

| CN | 102505591 A | 6/2012 | |
|---|---|---|---|
| DE | 102008035944 A1 * | 4/2010 | ......... G01C 21/3469 |
| WO | 2017144319 A1 | 8/2017 | |

OTHER PUBLICATIONS

Chien, "Feasibility of Lane Closure Using Probe Data", final report, published in New Jersey Institute of Technology, 2017, 116 pages.
(Continued)

*Primary Examiner* — Thomas G Black
*Assistant Examiner* — Sara J Lewandroski
(74) *Attorney, Agent, or Firm* — Ditthavong, Steiner & Mlotkowski

(57) ABSTRACT

Various aspects of a system, a method, and a computer program product for generation of roadwork extension data of a roadwork zone are disclosed herein. In accordance with an embodiment, the system includes a memory and a processor. The processor may be configured to obtain speed funnel data of one or more speed funnels. The processor may be configured to determine a plurality of candidate roadwork links, based on the speed funnel data. The processor may be configured to obtain vehicular trajectory data corresponding to the plurality of candidate roadwork links. The processor may be further configured to determine at least one qualified roadwork link from the plurality of candidate roadwork links, based on the vehicular trajectory data and speed threshold data of the plurality of candidate roadwork links. The processor may be further configured to generate the roadwork extension data based on the at least one qualified roadwork link.

18 Claims, 10 Drawing Sheets

(51) Int. Cl.
  *G08G 1/01* (2006.01)
  *G06K 9/00* (2022.01)

(52) U.S. Cl.
  CPC ....... *G06K 9/00818* (2013.01); *G08G 1/0112* (2013.01); *G08G 1/0125* (2013.01); *G08G 1/0133* (2013.01); *G08G 1/0141* (2013.01)

(58) Field of Classification Search
  CPC .... G01C 21/28; G01C 21/30; G06K 9/00791; G06K 9/00818; G08G 1/0104; G08G 1/0108; G08G 1/0112; G08G 1/0116; G08G 1/012; G08G 1/0125; G08G 1/0129; G08G 1/0133; G08G 1/0137; G08G 1/0141; G08G 1/0145

See application file for complete search history.

(56) References Cited

U.S. PATENT DOCUMENTS

| | | | |
|---|---|---|---|
| 2013/0245943 A1* | 9/2013 | Hiestermann | G01C 21/32 701/533 |
| 2013/0261970 A1* | 10/2013 | Papajewski | G01C 21/3469 701/540 |
| 2015/0161886 A1* | 6/2015 | Kesting | G08G 1/012 701/117 |
| 2015/0268053 A1* | 9/2015 | Yu | B60L 15/2045 701/22 |
| 2020/0042807 A1* | 2/2020 | Schutzmeier | G08G 1/0141 |

OTHER PUBLICATIONS

Pan et al., "Forecasting Spatiotemporal Impact of Traffic Incidents on Road Networks", published in University of Southern California, Oct. 2015, 10 pages.

* cited by examiner

SYSTEM AND METHOD FOR IDENTIFICATION OF A ROADWORK ZONE

TECHNOLOGICAL FIELD

Various embodiments of the present disclosure relate to navigation technology. More particularly, the various embodiments of the present disclosure relate to a system, a method, and a computer program to generate roadwork extension data of at least a roadwork zone.

BACKGROUND

Road works or roadwork zones are typically found on a section of a road, an entire road, or a sequence of roads that are occupied for the purpose of, for example, road surface repairs, work on power lines, water works and road accidents. In certain scenarios, the roadwork may disable an entire lane temporarily. As a result, travelers may experience delays and increased travel time on a road as compared to a road without roadwork. In some scenarios, drivers near a roadwork zone may have to drive skillfully and slowly. In certain other scenarios, the vehicles on a lane affected by the roadwork may be directed by road administration to take a detour via longer possible route. Consequently, the drivers and passengers may experience wastage of time and energy.

Nowadays, the technology has progressed towards an autonomous vehicle navigation world where accurate data plays a vital role. Presently, the roadwork zones may be indicated to vehicles, such as autonomous vehicles using road signs. In some countries, the roadwork zones may also be indicated to motorists or autonomous vehicles using lane markings from a distance of the roadwork zone and speed limit signs from a distance of the roadwork zone. In some scenarios, it may not be possible to clearly identify pictorial and iconic road signs when the vehicles move at very high speeds. Moreover, identification of such signs well in advance may be crucial for autonomous vehicles to avoid collisions and undue mishaps. In certain other scenarios, within a roadwork zone, there could be several vulnerable road users, lane displacements, lane merging, and heavy duty equipment. Therefore, it may be sensible for a vehicle to transition from autonomous driving mode to manual driving mode when the vehicle approaches a roadwork starting point.

BRIEF SUMMARY

A system, a method, and a computer program product are provided in accordance with an example embodiment described herein to generate roadwork extension data for identification of at least one roadwork zone.

In an example embodiment, a system for generating roadwork extension data of a roadwork zone is provided. The system may include at least one non-transitory memory configured to store computer program code instructions, and at least one processor configured to execute the computer program code instructions to at least: obtain speed funnel data of one or more speed funnels; determine a plurality of candidate roadwork links, based on the speed funnel data; obtain vehicular trajectory data corresponding to the plurality of candidate roadwork links; determine at least one qualified roadwork link from the plurality of candidate roadwork links, based on the vehicular trajectory data and speed threshold data of the plurality of candidate roadwork links; and generate the roadwork extension data based on the at least one qualified roadwork link. It is useful to identify the roadwork zones with the roadwork extension data well in advance and plan the course of drive, the speed of drive, or the mode of drive, such as manual or autonomous through the roadwork zone.

The speed funnel data corresponds to one or more speed funnel links associated with the one or more speed funnels. Each of the one or more speed funnels comprises at least two different learned speed signs. The processor may be further configured to search for one or more downstream links in downstream of a last speed funnel link of the one or more speed funnel links and one or more upstream links in upstream of a first speed funnel link of the one or more speed funnel links to determine the plurality of the candidate roadwork links. The plurality of candidate roadwork links may comprise the one or more downstream links, the one or more speed funnel links, and the one or more upstream links. The vehicular trajectory data may comprise vehicle speed data, vehicle location data, and vehicle heading data. The processor may be further configured to sample the vehicle location data over a time period and map-match the sampled location data to the plurality of candidate roadwork links. The processor may be further configured to identify at least one link attribute and a roadwork distance threshold, associated with the at least one qualified roadwork link; and generate the roadwork extension data, based on the at least one link attribute and the roadwork distance threshold. The at least one link attribute may be at least one of a functional class, a link start location, a link end location, or a link length.

The processor may be further configured to categorize, one or more candidate roadwork links from the plurality of candidate roadwork links, into a plurality of roadwork link segments, based on the at least one link attribute of each of the one or more candidate roadwork links; determine smooth vehicle speed data corresponding to each of the plurality of roadwork link segments, based on the vehicle speed data corresponding to each of the plurality of roadwork link segments; and determine the at least one qualified roadwork link, based on the smooth vehicle speed data, wherein the at least one qualified roadwork link comprises two or more roadwork link segments from the plurality of roadwork link segments.

The processor may be further configured to divide a link length of each of the one or more candidate roadwork links into a roadwork link segment length of each of the plurality of roadwork link segments; and categorize the one or more candidate roadwork links into the plurality of roadwork link segments, based on the roadwork link segment length of each of the plurality of roadwork link segments.

The processor may be further configured to validate the vehicle speed data corresponding to each of the plurality of roadwork link segments, based on a speed value of a last learned speed sign in a speed funnel of the one or more speed funnels that may be associated with the plurality of roadwork link segments; determine free flow speed data corresponding to each of the plurality of roadwork link segments, based on the validated vehicle speed data, wherein a free flow speed value of the free flow speed data may be less than a threshold speed value of the validated vehicle speed data; and determine the smooth vehicle speed data corresponding to each of the plurality of roadwork link segments, based on the free flow speed data.

The processor may be further configured to validate the plurality of roadwork link segments based on the smooth vehicle speed data. A smooth vehicle speed value of the smooth vehicle speed data may be greater than or equal to a rated speed threshold of each of the one or more speed funnel links. The rated speed threshold may be based on a tradeoff ratio. The processor may be further configured to calculate a distance between each of a plurality of pairs of consecutive validated roadwork link segments of the plurality of roadwork link segments; and extract a plurality of target roadwork link segments from the plurality of validated roadwork link segments, based on the calculated distance between each of the plurality of pairs of consecutive validated roadwork link segments that may be greater than the roadwork distance threshold.

The processor may be further configured to identify a start position of the roadwork zone with a start node of a first target roadwork link segment in the plurality of target roadwork link segments; identify an end position of the roadwork zone with an end node of a second target roadwork link segment in the plurality of target roadwork link segments. The first target roadwork link segment and the second target roadwork link segment may be consecutive target roadwork link segments among the plurality of pairs of consecutive validated roadwork link segments. The calculated distance between the first target roadwork link segment and the second target roadwork link segment may be largest among the calculated distance between the plurality of pairs of consecutive validated roadwork link segments. The processor may be further configured to generate the roadwork extension data of the roadwork zone, based on the identified start position and the identified end position of the roadwork extension.

Embodiments disclosed herein may provide a method for generating roadwork extension data of at least a roadwork zone. The method includes obtaining, by one or more processors, speed funnel data of one or more speed funnels; determining, by the one or more processors, a plurality of candidate roadwork links, based on the speed funnel data; obtaining, by the one or more processors, vehicular trajectory data corresponding to the plurality of candidate roadwork links; determining, by the one or more processors, at least one qualified roadwork link from the plurality of candidate roadwork links, based on the vehicular trajectory data and speed threshold data of the plurality of candidate roadwork links; and generating, by the one or more processors, the roadwork extension data based on the at least one qualified roadwork link.

Embodiments of the present invention may provide a computer program product including at least one non-transitory computer-readable storage medium having computer-executable program code instructions stored therein. The computer-executable program code instructions when executed by a computer, cause the computer to carry out operations generating route data of one or more routes through an area, the operations including: obtaining, by one or more processors, speed funnel data of one or more speed funnels; determining, by the one or more processors, a plurality of candidate roadwork links, based on the speed funnel data; obtaining, by the one or more processors, vehicular trajectory data corresponding to the plurality of candidate roadwork links; determining, by the one or more processors, at least one qualified roadwork link from the plurality of candidate roadwork links, based on the vehicular trajectory data and speed threshold data of the plurality of candidate roadwork links; and generating, by the one or more processors, the roadwork extension data based on the at least one qualified roadwork link.

BRIEF DESCRIPTION OF THE DRAWINGS

Figure 1:
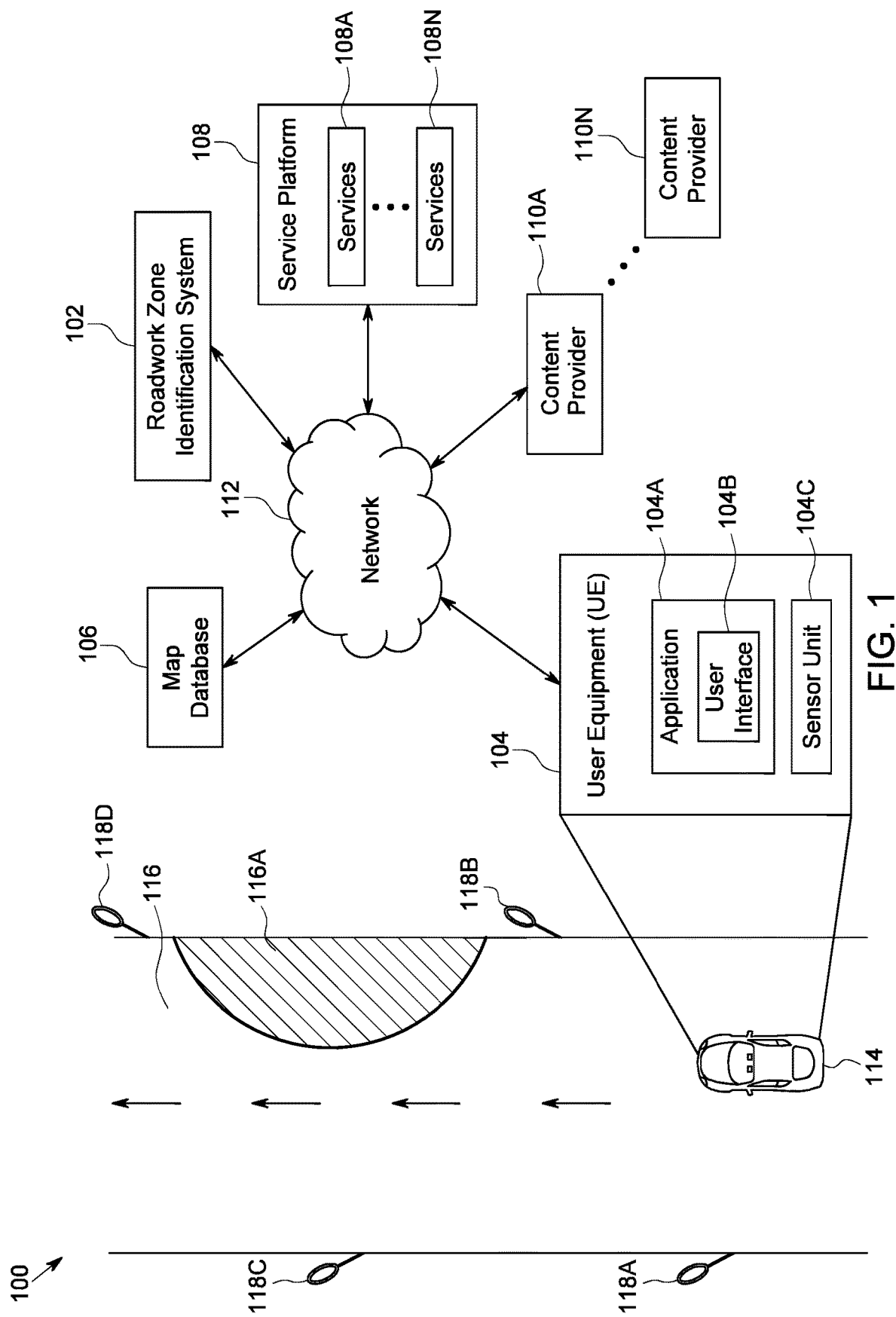
Figure 2:
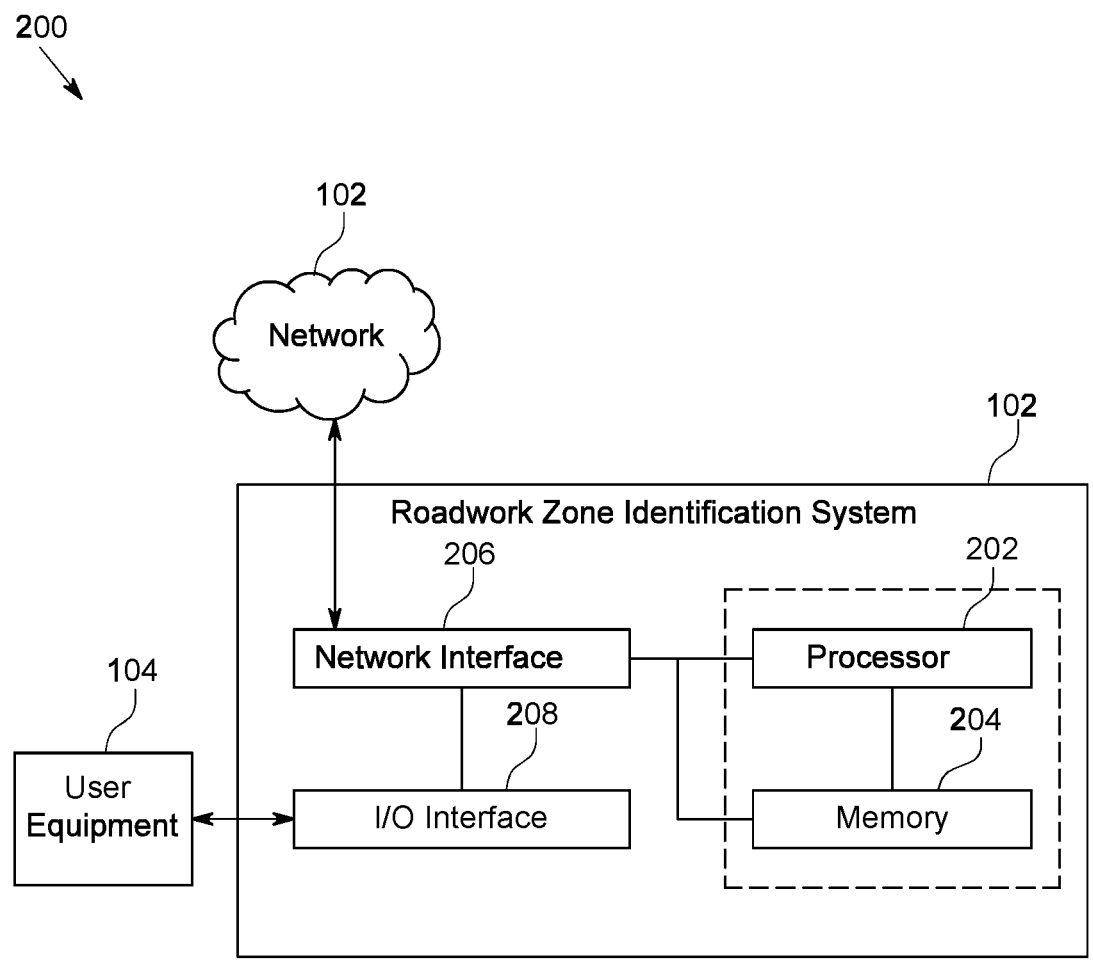
Figure 3A:
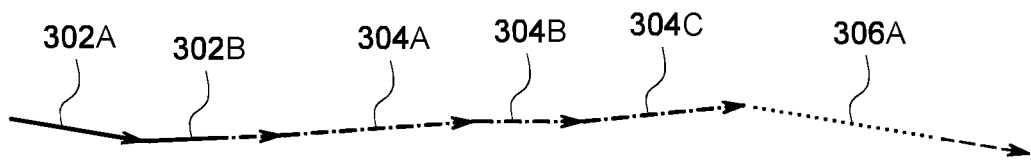
Figure 3B:
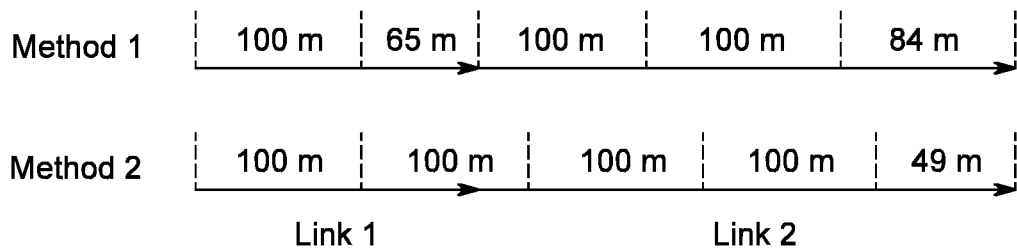
Figure 3C:
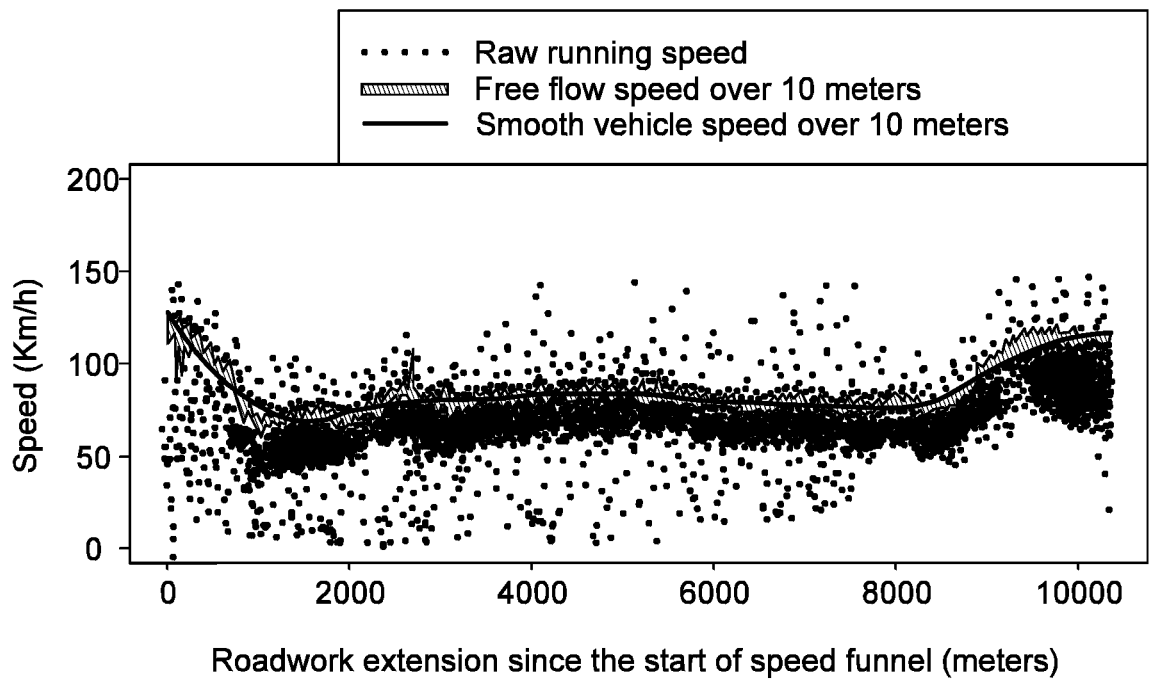
Figure 3D:
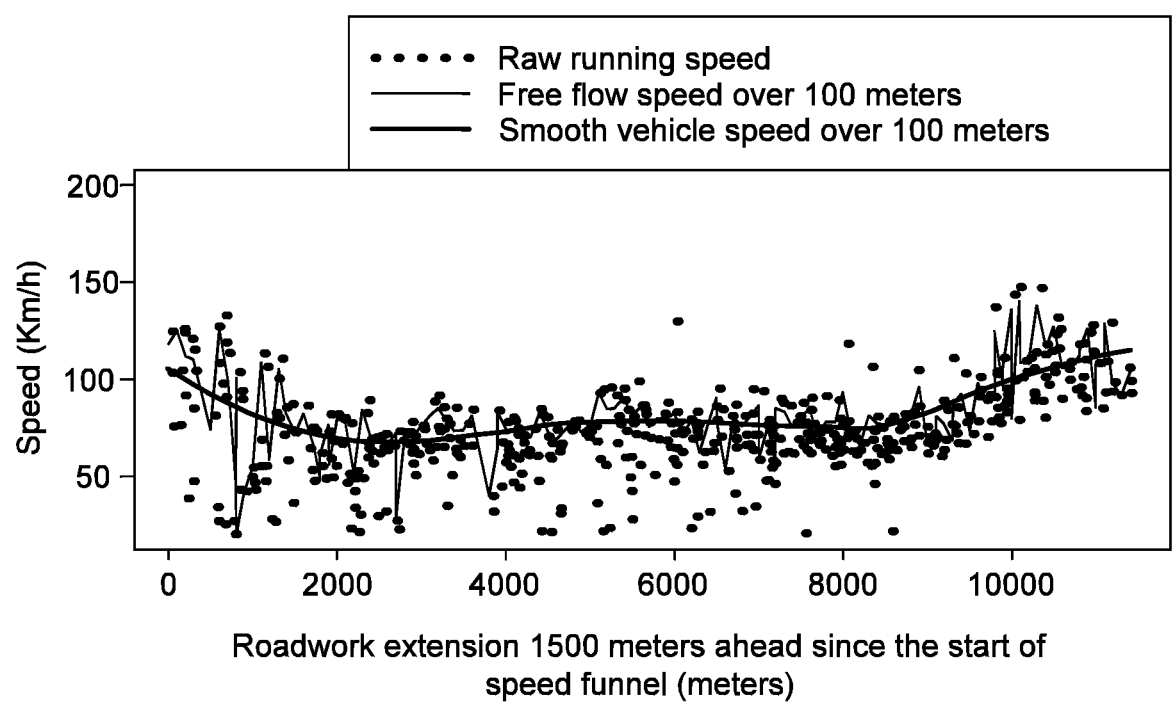
Figure 4A:
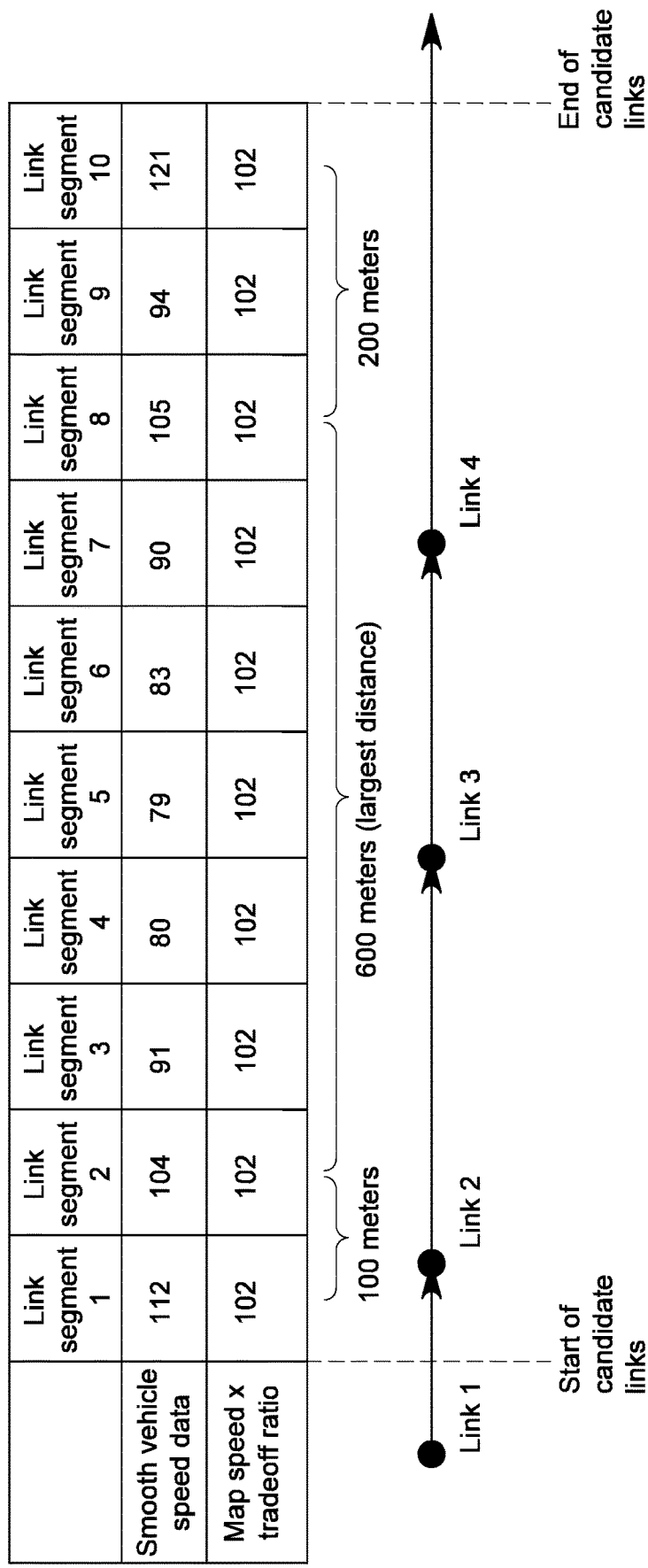
Figure 4B:
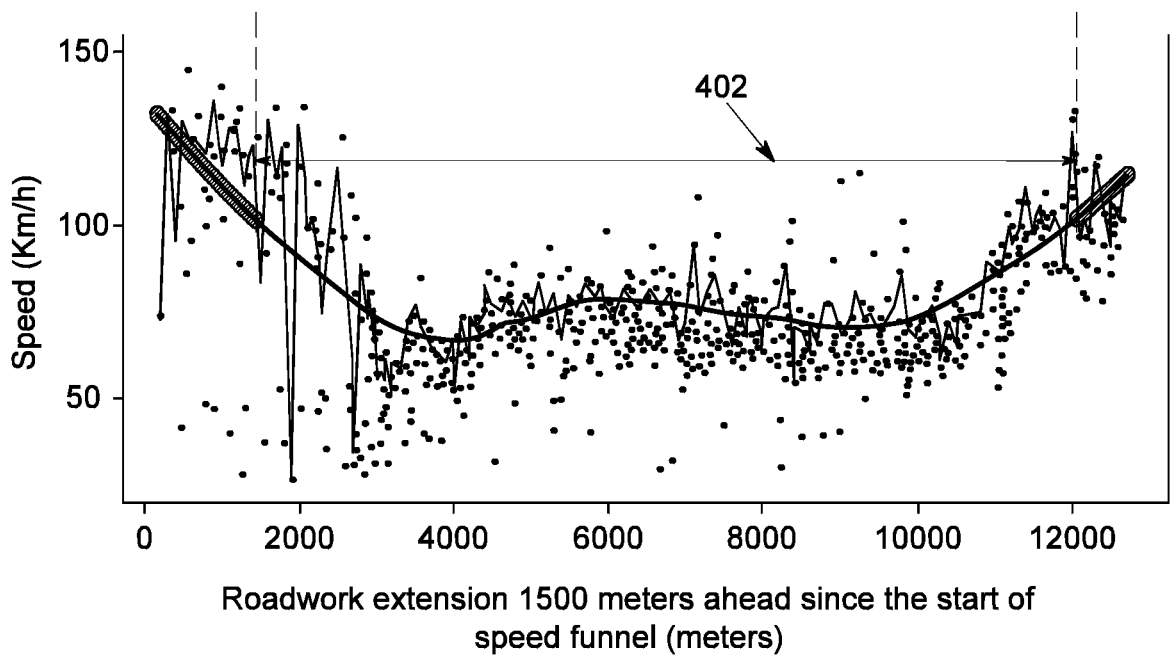
Figure 5A:
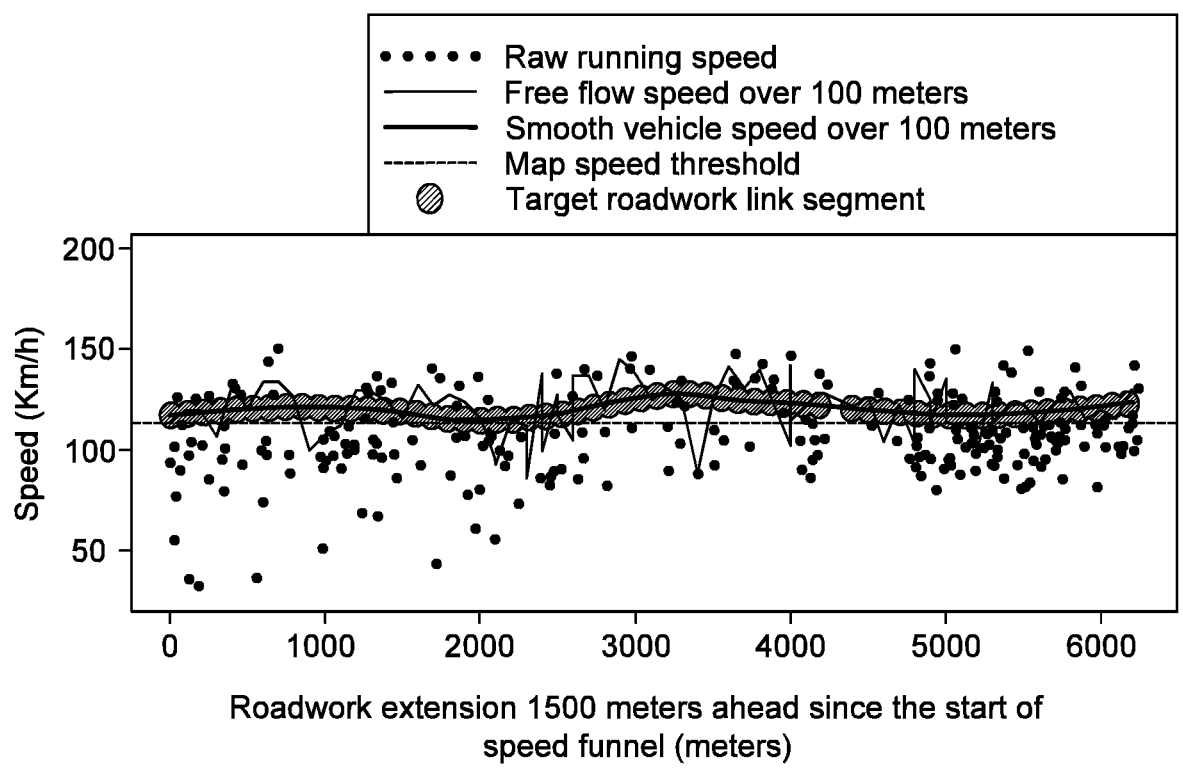
Figure 5B:
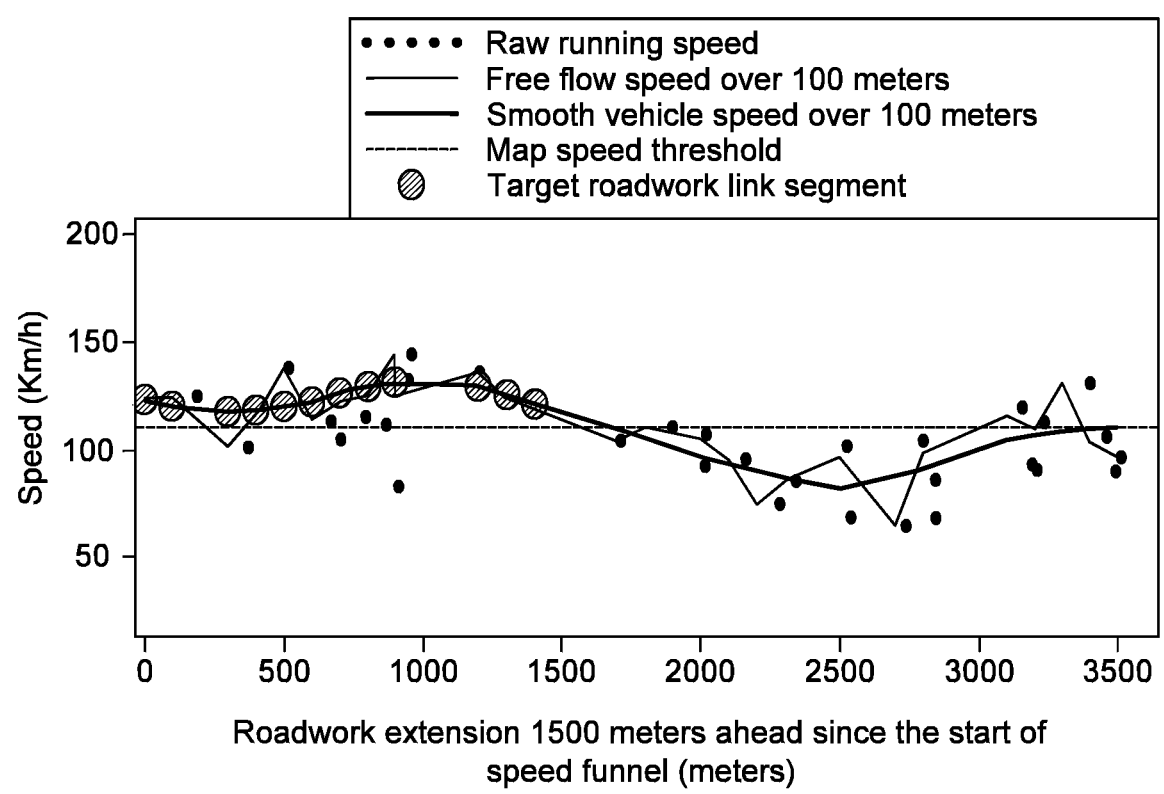
Figure 5C:
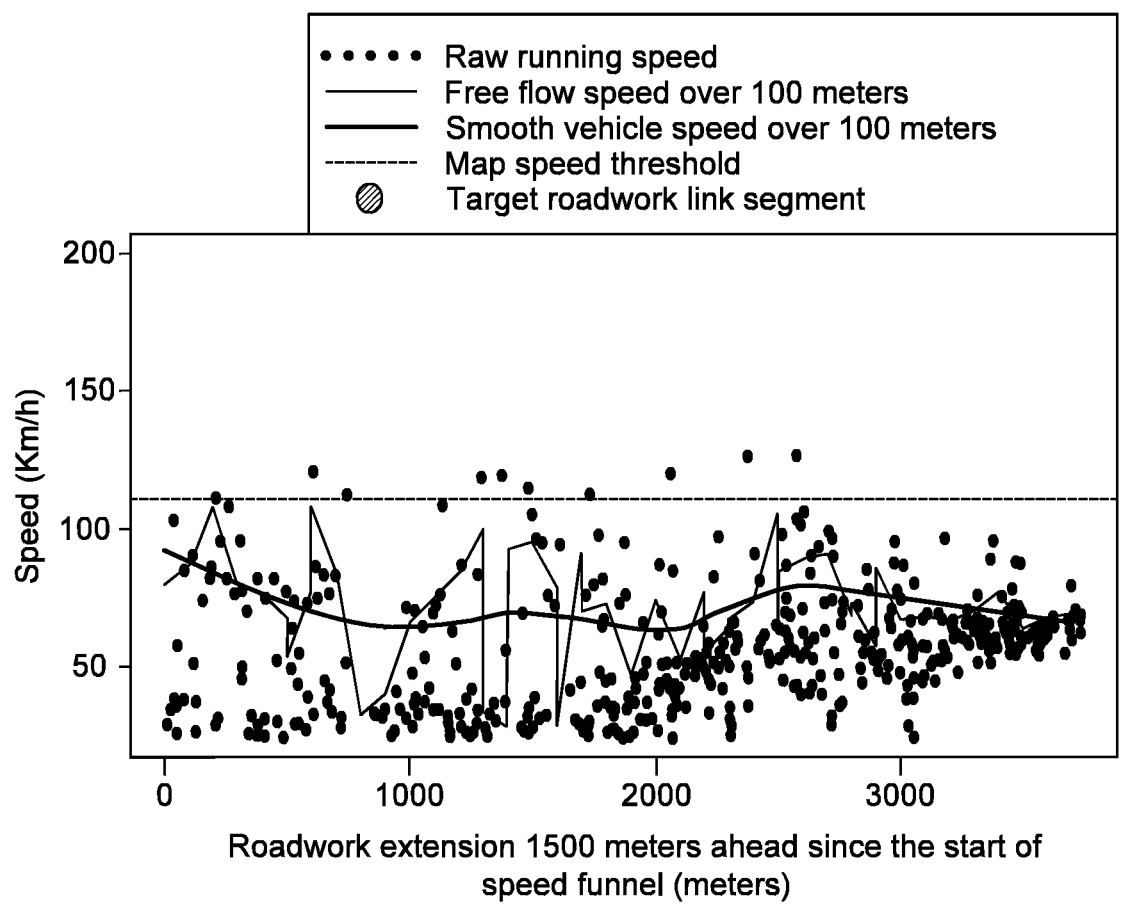
Figure 6A:
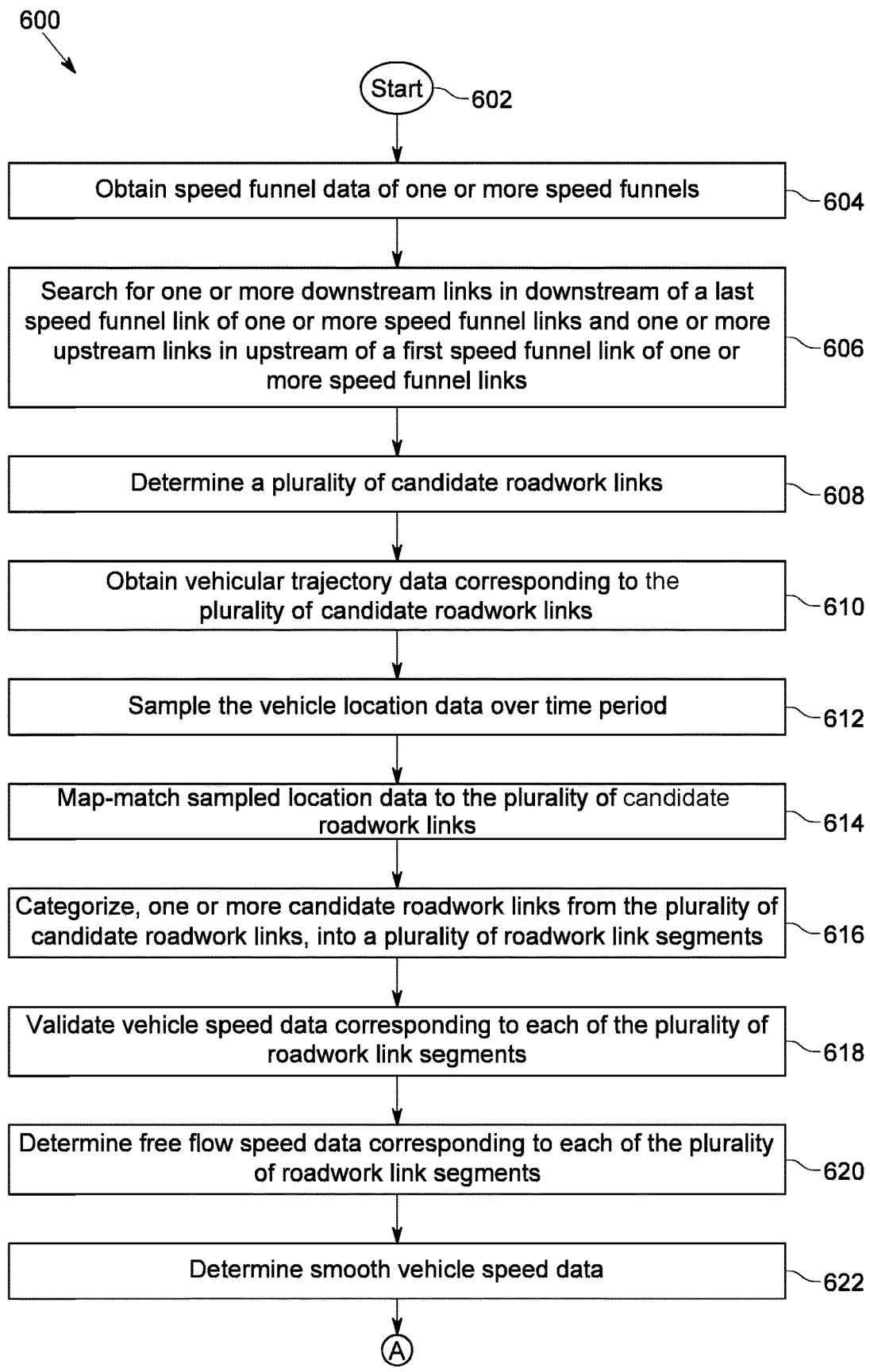
Figure 6B:
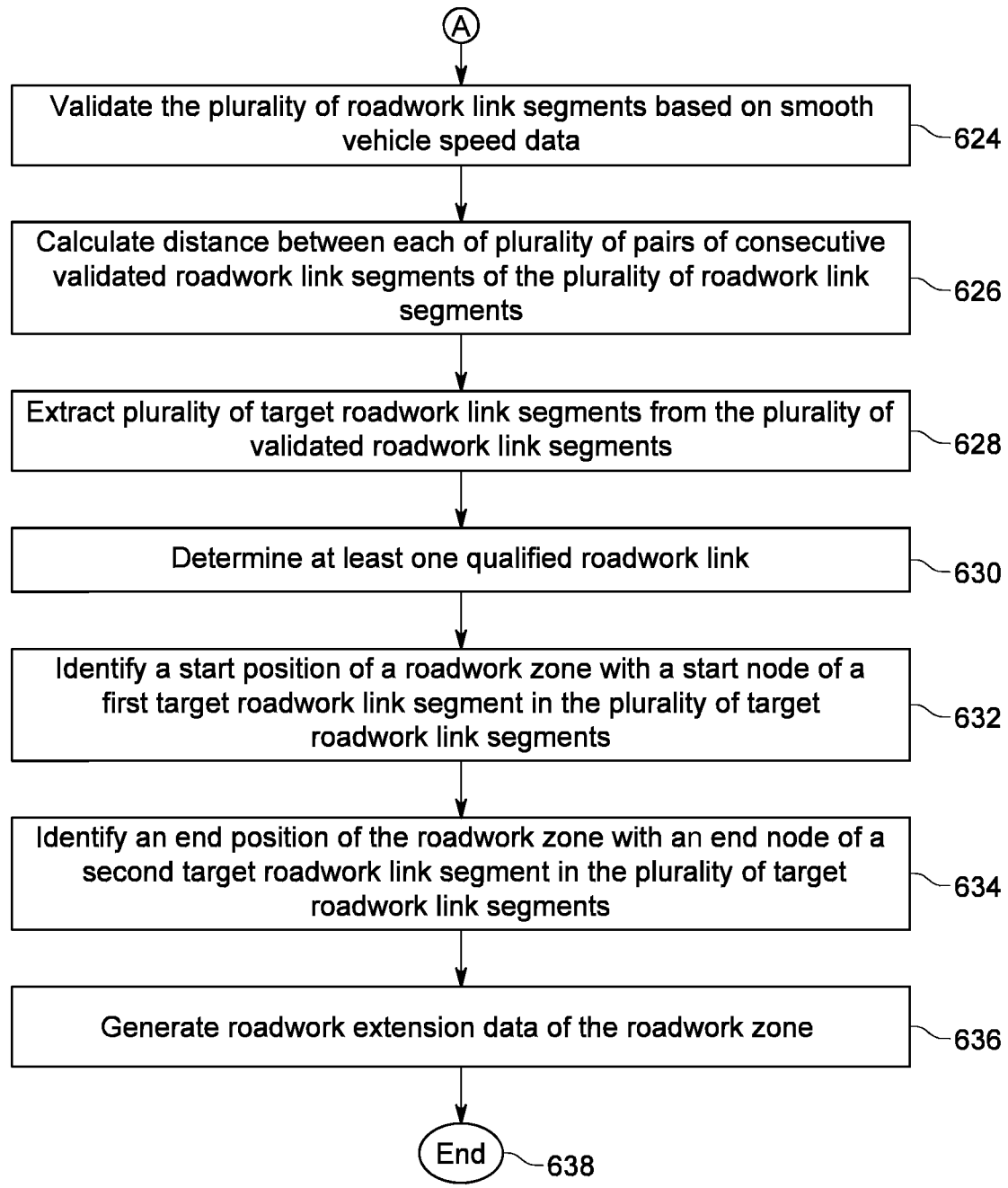

Having thus described example embodiments of the invention in general terms, reference will now be made to the accompanying drawings, which are not necessarily drawn to scale, and wherein:

FIG. 1 is a block diagram that illustrates a network environment of a roadwork zone identification system to generate the roadwork extension data of at least a roadwork zone, in accordance with an embodiment of the disclosure;

FIG. 2 is a block diagram that exemplarily illustrates a roadwork zone identification system for generating roadwork extension data of a roadwork zone, in accordance with an example embodiment;

FIG. 3A is a schematic diagram that illustrates a plurality of candidate roadwork links associated with a speed funnel, determined by the roadwork zone identification system, in accordance with an example embodiment;

FIG. 3B exemplarily illustrates two methods for categorization of candidate roadwork links into a plurality of roadwork link segments, in accordance with an example embodiment;

FIGS. 3C-3D exemplarily illustrate graphical representations of trends in vehicle speed data, free flow speed data, and smooth vehicle speed data corresponding to the roadwork link segments of the candidate roadwork links, in accordance with an example embodiment;

FIG. 4A exemplarily illustrates a tabular representation of the smooth vehicle speed data and the rated speed threshold for extracting a plurality of target roadwork link segments from roadwork link segments, by the roadwork zone identification system, in accordance with an example embodiment;

FIG. 4B exemplarily illustrates a graphical representation of trends in vehicle speed data, free flow speed data, and smooth vehicle speed data corresponding to the roadwork link segments of the candidate roadwork links shown in FIG. 4A to identify a qualified roadwork zone, in accordance with an example embodiment;

FIGS. 5A-5C exemplarily illustrate graphical representations of trends in vehicle speed data, free flow speed data, and smooth vehicle speed data corresponding to the roadwork link segments of the candidate roadwork links to identify qualified roadwork zone and disqualified roadwork zones, in accordance with an example embodiment; and FIGS. 6A-6B collectively illustrate a flowchart for implementation of an exemplary method to generate roadwork extension data of a roadwork zone, in accordance with an embodiment.

DETAILED DESCRIPTION OF THE INVENTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway with a pre-defined length. Examples of the link including, but not limited to, a roadway, a highway, a freeway, an expressway, a lane, a street path, a road, an alley, a controlled access roadway, a free access roadway and the like.

The term "speed funnel" may be used to refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp.

The term 'route' may be used to refer to a path from a source location to a destination location on any link.

The term 'roadwork extension data' may be used to refer to data defining the extent of a roadwork zone.

End of Definitions

A solution including, a system, a method, and a computer program product are provided herein in accordance with at least one example embodiment for generating roadwork extension data of at least one roadwork zone in a geographical location. The solution includes the process of building and accessing of a map for the geographic location curated with the markings corresponding to at least one roadwork zone. The system, that is, a roadwork zone identification system, functions in an environment with at least one vehicle. In one example, the vehicle may be an automated motor vehicle, such as, but not limited to, drone, auto driven car and the like; or manually operated machine such as, but not limited to, a car, a bus, a motor bike, and an aerial vehicle. Further, the vehicle may include a sensor unit configured to generate road sign observations based on capture of road signs along a route of the geographic location. The generated road sign observations may be further processed to identify at least one roadwork zone. The road signs may include speed limit signs that may form a speed funnel, lane markings, for example, yellow lane markings in countries, such as, Germany, etc. The speed limit signs of the speed funnel may indicate may be a tunnel, a bridge, a curvature road, a ramp, etc. The roadwork zone identification system may include a memory configured to store instructions and a processor configured to execute the instructions.

The roadwork zone identification system may use data from consumer vehicles on road, such as, the vehicular trajectory data and the speed funnel data of the consumer vehicles unlike probe data where vehicles are specially deployed by a map data service provider to collect such data and populate a map. Therefore, the data collected by the consumer vehicles may be huge since the number of consumer vehicles is large as compared to the special vehicles of the map data service provider deployed to collect the data. Further, the data collected from the consumer vehicles may have large coverage as compared to the special vehicles deployed to collect the data. As a result, the roadwork zone identification system may be configured to generate the roadwork extension data of one or more roadwork zones accurately well in advance, based on the data collected from the consumer vehicles.

FIG. 1 is a block diagram that illustrates a network environment 100 of a system, that is, a roadwork zone identification system 102, to generate the roadwork extension data of at least a roadwork zone, in accordance with an embodiment of the disclosure. There is shown the network environment 100 that may include the roadwork zone identification system 102, a user equipment (UE) 104, an application 104A, a user interface 104B, a sensor unit 104C, a map database 106, a services platform 108 with a plurality of services 108A . . . 108N, a plurality of content providers 110A . . . 110N, and a network 112. There is further shown one or more vehicles, such as a vehicle 114 on a roadway 116 affected by a roadwork zone 116A. There are further shown speed limit signs 118A-118D on the roadway 116. The UE 104 may include the application 104A, the user interface 104B, and the sensor unit 104C. The roadwork zone identification system 102 may be communicatively coupled to the UE 104, via the network 112. Further, the roadwork zone identification system 102 may be communicatively coupled to the map database 106, via the communication network 112. Also, the roadwork zone identification system 102 may be communicatively coupled to the services platform 108 and the plurality of content provider 110A . . . 110N, via the network 112. In some example embodiments, the roadwork zone identification system 102 may be implemented in a cloud computing environment. In some other example embodiments, the roadwork zone identification system 102 may be implemented in the vehicle 114. All the components in the network environment 100 may be coupled directly or indirectly to the network 112. The components described in the network environment 100 may be further broken down into more than one component and/or combined together in any suitable arrangement. Further, one or more components may be rearranged, changed, added, and/or removed.

The roadwork zone identification system 102 may comprise suitable logic, circuitry, interfaces, and code that may be configured to generate the roadwork extension data of one or more roadwork zones. Further, the roadwork zone identification system 102 may be configured to obtain speed funnel data of one or more speed funnels. The speed funnel data may be associated with the road sign observations of the speed limit signs 118A-118D. The roadwork zone identification system 102 may also be configured to obtain vehicular trajectory data related to the vehicles, such as, the vehicle 114 on the roadway 116. Additionally or alternatively, the roadwork zone identification system 102 may be configured to receive geo-coordinates of the location of the roadwork zone 116A from map data stored in the map database 106.

The UE 104 may comprise suitable logic, circuitry, interfaces, and code that may be configured to provide navigation assistance to the vehicles, such as, the vehicle 114 among other services. In accordance with an embodiment, the UE 104 may be configured to provide navigation and map functions (such as, guidance and map display) for an end user (not shown in the FIG. 1). The vehicle 114 associated with the UE 104 may correspond to an autonomous vehicle or a manually driven vehicle. An autonomous vehicle, as used throughout the disclosure, may refer to a vehicle which has autonomous driving capabilities at least in some conditions. For example, the autonomous vehicle may exhibit autonomous driving on streets and roads having physical dividers between driving lanes. The UE 104 may be a part of the vehicle 114. The UE 104 may be installed in the vehicle 104. In accordance with an embodiment, the UE 104 may be the vehicle itself. The UE 104 may include the application 104A with the user interface 104B, and the sensor unit 104C. In accordance with an embodiment, the UE 104 may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-related functions (such as digital routing and map display). Examples of the UE 104 may include, but is not limited to, a mobile computing device (such as a laptop computer, tablet computer, mobile phone and smart phone), navigation unit, personal data assistant, watch, and camera. Additionally or alternatively, the UE 104 may be a fixed computing device, such as a personal computer, computer workstation, kiosk, office terminal computer or a system.

In accordance with an embodiment, the UE 104 may be an in-vehicle navigation system for navigation and map functions (such as, guidance and map display). The UE 104 may include the application 104A with the user interface 104B to access one or more map and navigation related functions. In other words, the UE 104 may include the application 104A (such as, a mapping application) with the user interface 104B. The user interface 104B may be configured to enable the end user associated with the UE 104 to access the roadwork zone identification system 102.

The sensor unit 104C may be configured within the UE 104. The sensor unit 104C comprising multiple sensors may capture road signs along routes in a geographic location. The sensor unit 104C may include one or more sensors to generate the road sign observations. For example, the sensor unit 104C may include an image capture device (such as, a camera) to capture the road signs (such as, speed limit signs 118A to 118D). The UE 104 may be configured to generate road sign observations based on sensor data captured by the sensors. In accordance with an embodiment, the UE 104 may be accessible to the roadwork zone identification system 102 via the network 112. In certain embodiments, the sensor unit 104C may be configured to detect road signs for determination of positioning of the vehicle 114. In accordance with an embodiment, the sensor unit 104C may be built-in, or embedded into, or within interior of the UE 104. In some embodiments, the vehicle 114 may have sensors positioned on or within the vehicle 114. The sensors of the sensor unit 104C may be configured to provide sensor data comprising location data associated with a location of the vehicle 114, heading data associated with the road signs, (such as, speed limit signs 118A to 118D), sign types of the road signs, sign values of the road signs along the roadway 116 approaching the roadwork zone 116A. The sensors may generate the location data from systems, that include, but not limited to, a positioning system, a Global Navigation Satellite System (such as Global Positioning System (GPS), Galileo, GLONASS and BeiDou), cellular tower location methods, access point communication fingerprinting (such as Wi-Fi or Bluetooth based radio maps). In accordance with an embodiment, the sensor unit 104C may be configured to transmit the sensor data to an Original Equipment Manufacturer (OEM) cloud. Examples of the sensors in the sensor unit 104C may include, but not limited to, a camera, an acceleration sensor, a gyroscopic sensor, a LIDAR sensor, a proximity sensor, and a motion sensor.

The map database 106 may comprise suitable logic, circuitry, interfaces, and code that may be configured to store data related to the roadwork zone 116A. The data may include node data, roadway segment data, roadway link data, point of interest (POI) data, and posted signs related data. The data may also include cartographic data, routing data, and maneuvering data. The node data may be end points corresponding to the respective links or segments of road segment data. The roadway segment data may correspond to links or segments that represent roads, streets, or paths. The roadway link data may represent a road network used by vehicles, such as, the vehicle 114. The map database 106 may be configured to store data related to roadwork zones, such as, but not limited to, location of the roadwork zones, diversions to be caused due to the roadwork zones, suggested routes to avoid congestion to be caused due to the roadwork zones. In accordance with an embodiment, the map database 106 may be configured to receive data related to roadwork zones from external systems, such as, roadwork planning system of the municipalities.

In some embodiments, the map database 106 may be part of a mapping platform (not shown in the FIG. 1). In such embodiments, the map database 106 may be configured to provide a repository of techniques for implementation of a plurality of location based services for navigation systems. For example, the mapping platform may include techniques related to geocoding, routing (multimodal, intermodal, and unimodal), clustering algorithms, machine learning in location based solutions, natural language processing algorithms, artificial intelligence algorithms, and the like. The data for different modules of the mapping platform may be collected using a plurality of technologies including, but not limited to drones, sensors, connected cars, cameras, probes, chipsets and the like. In some embodiments, the mapping platform may be embodied as a chip or chip set. In other words, the mapping platform may comprise one or more physical packages (such as, chips) that includes materials, components and/or wires on a structural assembly (such as, a baseboard). The map database 106 may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the UE 104. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database 106 in a delivery format to produce one or more compiled navigation databases.

In some embodiments, the map database 106 may be a master geographic database configured on the side of the roadwork zone identification system 102. In accordance with an embodiment, a client-side map database may represent a compiled navigation database that may be used in or with end user devices (e.g., the UE 104) to provide navigation, speed adjustment, and/or map-related functions to navigate through roadwork zones. The roadwork zone identification system 102 may cluster the road sign observations to generate learned road signs that are map-matched on links of a map developed by the map developer.

Optionally, the map database 106 may contain path segment and node data records or other data that may represent pedestrian paths or areas in addition to or instead of the vehicle road record data. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, and parks. The map database 106 may include data about the POIs and their respective locations in the POI records. The map database 106 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 106 may include event data (e.g., traffic incidents, construction activities, scheduled events, unscheduled events, etc.) associated with the POI data records or other records of the map database 106 associated with the roadwork zone identification system 102.

The services platform 108 may provide navigation related functions and services 108A . . . 108N to the application 104A running on the UE 104. The services 108A . . . 108N may include navigation functions, speed adjustment functions, traffic related updates, weather related updates, warnings and alerts, parking related services and indoor mapping services. In accordance with an embodiment, the services 108A . . . 108N may be provided by the plurality of content providers 110A . . . 110N. In some examples, the plurality of content providers 110A . . . 110N may access various Software Development Kits (SDKs) from the services platform 108 for implementation of one or more services 108A . . . 108N. In accordance with an embodiment, the services platform 108 and the roadwork zone identification system 102 may be integrated into a single platform to provide a suite of mapping and navigation related applications for OEM devices, such as the UE 104. The UE 104 may be configured to interface with the services platform 108, the plurality of content provider 110A . . . 110N, and the roadwork zone identification system 102 over the network 112. Thus, the roadwork zone identification system 102 and the services platform 108 may enable provision of cloud-based services for the UE 104, such as, storing the road sign observations in the OEM cloud in batches or in real-time and retrieving the stored road sign observations for generating a speed funnel and identifying a roadwork zone 116A in the vicinity of the speed funnel.

The plurality of content providers 110A . . . 110N may be configured to maintain data stored in the map database 106. In accordance with an embodiment, the plurality of content providers 110A . . . 110N may correspond to map developers which collect geographic data to generate and enhance the map database 106. In accordance with an embodiment, the map developers may obtain data from other sources, such as municipalities or respective geographic authorities. In accordance with an embodiment, the map developer may collect data from consumer vehicles travelling on the road throughout the geographic region. In accordance with an embodiment, the map developer may employ field personnel to travel by a vehicle along roads throughout the geographic region to observe features and/or record information. The map developers may crowdsource geographic map data to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time or near real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, and ultrasonic sensors. The gathering of large quantities of crowd-sourced data may facilitate the accurate modeling and mapping of an environment, whether it is a road segment or the interior of a multi-level parking structure. In accordance with an embodiment, remote sensing, such as aerial or satellite photography, may be used to generate map geometries directly or through machine learning.

The network 112 may comprise suitable logic, circuitry, and interfaces that may be configured to provide a plurality of network ports and a plurality of communication channels for transmission and reception of data, such as the sensor data, map data from the map database 106, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 112 may include a medium through which the roadwork zone identification system 102, and/or the map database 106 may communicate with each other. The network 112 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 112 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the vehicle 114 may navigate along at least a route (which may be simply referred as a route) of a geographical area. The vehicle 114 may navigate through the route that includes a roadwork zone 116A. In one example, a length or extent of the roadwork zone 116A may be referred to as roadwork extension.

Although one vehicle 114 is depicted in FIG. 1, it may be contemplated that the roadwork zone identification system 102 may operate with multiple vehicles in tandem. As such, while one or more such vehicles as vehicle 114 may capture road sign observations to identify a speed funnel and roadwork extension of a roadwork zone 116A in the vicinity of the speed funnel, one or more other vehicles may utilize the roadwork extension data generated by the roadwork zone identification system 102 to provide navigation assistance and related functions.

Based on the road sign observations captured by a plurality of vehicles, such as, 114, the mapping platform may store the road sign observations in the map database 106. Based on the road sign observations, the mapping platform may generate one or more speed funnels indicating one or more roadwork zones and speed funnel data associated with the generated speed funnels. The mapping platform may store the speed funnel in the map database 106. The roadwork zone identification system 102 may obtain the speed funnel data of the speed funnels from the map database 106. The roadwork zone identification system 102 may obtain speed funnel data of one or more speed funnels. The speed funnel data corresponds to one or more speed funnel links associated with the speed funnels. In an embodiment, the speed funnel data may be stored in the OEM cloud and the roadwork zone identification system 102 may obtain the speed funnel data from the OEM cloud. The speed funnel data may include FUNNEL_ID of the speed funnel, the location of the speed funnel, the learned speed signs constituting the speed funnel, etc. In some example embodiments, the vehicle 114 may be configured to generate at least one speed funnel from the road sign observations and the roadwork zone identification system 102 may obtain the speed funnel data associated with the speed funnels from the vehicle 114. In accordance with an embodiment, the roadwork zone identification system 102 may generate at least one speed funnel, based on the sensor data from the UE 104. The sensor data generated by the sensor unit 104C may constitute road sign observations. The sensor unit 104C installed in the vehicle 114 or the UE 104 may capture road signs, such as 118A to 118D along the route and capture the location of the road sign, type of the road sign, value of the road sign, heading at the location of the road sign, and time stamp associated with the time of capture of the road sign. The captured location of the road sign, type of the road sign, value of the road sign, heading at the location of the road sign, and time stamp associated with the capture of the road sign may constitute the road sign observations. Based on the road sign observations, the roadwork zone identification system 102 may generate learned road signs using clustering techniques. Using the learned road signs, another vehicle, such as, 114 may generate at least one speed funnel that indicates a roadwork zone 116A in the vicinity of the speed funnel.

In one example, the road signs may be static road signs or variable road signs positioned along the routes. Sign values of variable road signs may vary based on traffic conditions in the vicinity of the variable road signs. For example, the variable road signs may be displayed on LCD display panels, LED panels, etc. positioned along the road. In accordance with an embodiment, the data captured by the sensor unit 104C may be curated into road sign observations and transmitted to the OEM cloud sequentially. In accordance with an embodiment, the roadwork zone identification system 102 may schedule road sign observations for transmission to the OEM cloud in batches. In such scenarios, the roadwork identification system 105 may retrieve the road sign observations from the OEM cloud.

The roadwork zone identification system 102 may be configured to determine a plurality of candidate roadwork links, based on the speed funnel data. The plurality of candidate roadwork links may comprise one or more downstream links, one or more speed funnel links, and one or more upstream links. Furthermore, the roadwork zone identification system 102 may search in downstream of a last speed funnel link of the speed funnel links to obtain the downstream links and the roadwork zone identification system 102 may search in upstream of a first speed funnel link of the speed funnel links to obtain the upstream links The roadwork zone identification system 102 may be configured to obtain vehicular trajectory data corresponding to the plurality of candidate roadwork links from the sensor unit 104C of the UE 104 associated with the vehicle 114. The vehicular trajectory data may include vehicle speed data, vehicle location data, and vehicle heading data of the vehicles, such as, 114 navigating through the candidate roadwork links. The roadwork zone identification system 102 may determine at least one qualified roadwork link from the plurality of candidate roadwork links, based on the vehicular trajectory data and speed threshold data of the plurality of candidate roadwork links. The speed threshold data may correspond to map speed data of each of the plurality of candidate roadwork links. The qualified roadwork link may indicate a roadwork zone. The speed threshold data may correspond to the map speed data from the speed funnel links. The determination of the qualified roadwork link is as disclosed in the detailed description of FIG. 2.

The roadwork zone identification system 102 may generate the roadwork extension data of the roadwork zone 116A based on the at least one qualified roadwork link. The roadwork zone identification system 102 may generate a map curated with one or more roadwork zones, such as, 116 marked. The curated map may be stored in the map database 106, where the map database 106 may be used with an end user device, such as, the UE 104 to provide the end user with navigation features and identify the roadwork zones in advance. In one example, the map database 106 may be downloaded or stored on the UE 104 which may access the roadwork zone identification system 102 through a wireless or wired connection, over the network 112. Therefore, the UE 104 may be configured to receive notification from the roadwork zone identification system 102 about location of the roadwork zone 116A.

FIG. 2 is a block diagram 200 that exemplarily illustrates the roadwork zone identification system 102 for generating roadwork extension data of a roadwork zone. FIG. 2 is described in conjunction with elements from FIG. 1. The roadwork zone identification system 102 may include one or more processors, such as a processor 202, a memory 204, a network interface 206, and an input/output (I/O) interface 208. The roadwork zone identification system 102 may connect to the UE 104 via the I/O interface 208. The processor 202 may be communicatively coupled to the network interface 206, the I/O interface 208, and the memory 204.

The processor 202 may comprise suitable logic, circuitry, and interfaces that may be configured to execute instructions stored in the memory 204. The processor 202 may be configured for generating the roadwork extension data of the roadwork zone 116A. Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading. Additionally or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an embodiment of the disclosure by further configuration of the processor 202 by instructions for performing the algorithms and/or operations described herein.

In some embodiments, the processor 202 may be configured to provide Internet-of-Things (IoT) related capabilities to users of the roadwork zone identification system 102 disclosed herein. The IoT related capabilities may in turn be used to provide smart city solutions by providing real time parking updates, big data analysis, and sensor based data collection for providing navigation and parking recommendation services and roadwork zone identification services. In some embodiments, the roadwork zone identification system 102 may be configured to provide an environment for development of parking strategy recommendation solutions for navigation systems in accordance with the embodiments disclosed herein. The environment may be accessed using the I/O interface 208 of the roadwork zone identification system 102 disclosed herein.

The memory 204 may comprise suitable logic, circuitry, and interfaces that may be configured to store a machine code and/or instructions executable by the processor 202. The memory 204 may be configured to store information including processor instructions for generating the roadwork extension data of the roadwork zone 116A. The memory 204 may be used by the processor 202 to store temporary values during execution of processor instructions. The memory 204 may store sensor data from the sensor unit 104C and the map data from the map database 106. The map database 106 may be configured to store instructions associated with a plurality of intelligent services that operate in the roadwork zone identification system 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of roadwork zone identification system 102 and other systems and devices in the network environment 100, via the network 112. The network interface 206 may communicate with the services platform 108 and the plurality of content provider 110A . . . 110N, via the network 112 under the control of the processor 202. In one embodiment, the network interface 206 may be configured to communicate with the sensor unit 104C disclosed in the detailed description of FIG. 1 and may receive road sign observations corresponding to one or more speed funnels. In an alternative embodiment, the network interface 206 may be configured to receive the road sign observations from the OEM cloud over the network 112 as described in FIG. 1. In some example embodiments, the network interface 206 may be configured to receive destination information of a vehicle, such as the vehicle 114, via the network 112. The network interface 206 may be configured to receive vehicular trajectory data describing position of the vehicle 114, from the UE 104 installed in the vehicle 114. In accordance with an embodiment, a controller of the UE 104 may receive the sensor data from a positioning system of the UE 104. The network interface 206 may be implemented by use of known technologies to support wired or wireless communication of the roadwork zone identification system 102 with the network 112. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between a user (e.g., a driver) of the UE 104 and different operational components of the roadwork zone identification system 102 or other devices in the network environment 100. The I/O interface 208 may facilitate an I/O device (for example, an I/O console) to receive an input (e.g., road sign observations from the sensor unit 104C of the UE 104) and present an output to the UE 104 based on the received input. The I/O interface 208 may include various input and output ports to connect various I/O devices that may communicate with different operational components of the roadwork zone identification system 102. The I/O interface 208 may be configured to output the roadwork extension data to a user device such as the UE 104 of FIG. 1. In some example embodiments, the I/O interface 208 may be configured to provide the roadwork extension data to the map database 106 to update the map of the roadway 116 on which the roadwork zone 116A lies. Thus, a user requesting a route through such a road may be updated about the presence of the roadwork zone 116A using the roadwork extension data. In an embodiment, the roadwork zone identification system 102 may be configured to assist in providing navigational suggestions to the user of the vehicle 114 to avoid the roadwork zone 116A. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

In operation, a plurality of vehicles, such as, 114 may navigate through a route that includes a speed funnel. The sensor unit 104C of the UE 104 associated with the plurality of vehicles may capture a plurality of road sign observations corresponding to the road signs such as, the speed limit signs 118A-118D and the mapping platform may generate learned speed signs. The mapping platform may further identify one or more speed funnels from the learned speed signs and store speed funnel data of each of the speed funnels in the map database 106. The speed funnels may be indicative of a ramp, a roadwork zone, a tunnel, etc., in vicinity of the speed funnel.

In accordance with an embodiment, the processor 202 may be configured to generate learned speed signs from the road sign observations captured by the sensor unit 104C. In accordance with an embodiment, the sensor data from different sensors of the sensor unit 104C installed in the UE 104 or the vehicle 114 may be converted to units and ranges compatible with the roadwork zone identification system 102 to accurately generate learned speed signs. The processor 202 may map-match such generated learned speed signs to links corresponding to the roadway 116. In accordance with an embodiment, the processor 202 may be configured to analyze the learned speed signs and generate speed funnels.

The speed funnel data of each speed funnel may include FUNNEL_ID, sign values of the learned speed signs in the speed funnel, location data associated with learned speed signs in the speed funnel, link data associated with one or more map-matched links in the speed funnel, etc. The map-matched links associated with the speed funnel are referred to as speed funnel links. The link data of the speed funnel links may include LINK_IDs of the speed funnel links, link start location of the speed funnel links, link end location of the speed funnel links, link upstream heading of each of the speed funnel links, link downstream heading of each of the speed funnel links, link shape locations of each the speed funnel links, etc.

Each speed funnel may include at least two different learned speed signs. That is, the learned speed signs constituting the speed funnel are different from each other. A speed funnel may comprise the learned speed signs with sign values in an increasing order or decreasing order. For example, consider a roadway of length of 100 km. The first speed funnel link of the roadway, which may extend for a length of 20 km, may have a speed limit of 60 km/h, the next speed funnel link may have a speed limit of 80 km/h and the successive speed funnel link may have a speed limit of 100 km/h. A speed funnel with the three speed funnel links may be formed from the above-mentioned speed limit signs in an increasing order (20, 60, 80), referred to as an increasing speed funnel and another speed funnel may be formed from the above mentioned speed limit signs in a decreasing order (80, 60, 20), referred to as a decreasing speed funnel. The increasing speed funnel indicates that the roadwork zone, tunnel, or ramp may be on the roadway behind the speed funnel links and thus, the speed of the vehicle, such as, 114 can be increased. The decreasing speed funnel indicates that the roadwork zone, tunnel, or ramp is ahead of the speed funnel links and thus, the speed of the vehicle 114 needs to be decreased.

The processor 202 may be configured to obtain the speed funnel data of the speed funnels from the map database. In accordance with an embodiment, the network interface 206 may be configured to receive speed funnel data of one or more speed funnels of a route or a pathway directly from a pre-stored source, such as, the OEM cloud or the vehicle 114. The processor 202 may be configured to filter out irrelevant speed funnels because not every speed funnel may correspond to roadwork zones. The processor 202 may filter out the speed funnels corresponding to lane mergers, curved roads, tunnels, and determines speed funnels corresponding to roadwork zone 116A to generate roadwork extension data of the roadwork zone 116A. The processor 202 determines the speed funnels that correspond to the roadwork zone 116A by determining vehicle speed pattern (or a speed concave). The basic assumption to determine the vehicle speed pattern may be that vehicles slow down at the start of the roadwork zone 116A and recover speed at the end of the roadwork zone 116A. One or more links corresponding to the roadwork zone are referred to as roadwork links. The processor 202 may be configured to detect speed concave of a plurality of vehicles, such as, 114 navigating on the speed funnel links, and in upstream and downstream of the speed funnel links to identify the roadwork links. To detect the speed concave, the processor 202 may be configured to determine a plurality of candidate roadwork links and subsequently, determine at least one qualified roadwork link from the plurality of candidate roadwork links.

The processor 202 may be configured to determine the plurality of candidate roadwork links. Such determination of the plurality of candidate roadwork links may be based on the speed funnel data. The plurality of candidate roadwork links may include one or more downstream links, the speed funnel links, and one or more upstream links. The processor 202 may be configured to search for the one or more downstream links in the downstream of a last speed funnel link of the speed funnel links. The processor 202 may be further configured to search for the one or more upstream links in upstream of a first speed funnel link of the funnel links. The inclusion of the downstream links and the upstream links in the candidate roadwork links is because vehicle speed change may be ahead of a speed funnel. The more the number of downstream links and the upstream links may bring about better accuracy to generate roadwork extension data. The first speed funnel link corresponds to the map-matched link on which the first learned speed sign of the speed funnel is located and the last speed funnel link corresponds to the map-matched link on which the last learned speed sign of the speed funnel is located. In an embodiment, where the speed funnel comprises only one speed funnel link, the first speed funnel and the last speed funnel link correspond to the same speed funnel link. The processor 202 searches for the downstream links in the downstream of the end node of the last speed funnel link within a threshold distance from the end node of the last speed funnel link and the processor 202, further, searches for the upstream links in the upstream of the link start node of the first speed funnel link with the threshold distance till the start node of the first speed funnel link.

In an embodiment, the processor 202 may search for the upstream links that have a downstream heading same as the upstream heading of the first speed funnel link and the downstream links that have an upstream heading same as the downstream heading of the last speed funnel link. The downstream links, the speed funnel links, and the upstream links are exemplarily illustrated in FIG. 3A.

Further, a plurality of vehicles, such as, 114 navigating through the candidate roadwork links may identify the road signs 118A-118D that are learnt, that is, the learned speed signs in the speed funnel on the roadway 116 using the sensor unit 104C of the UE 104. Such vehicles may generate vehicular trajectory data corresponding to the candidate roadwork links. The vehicular trajectory data comprises vehicle location data, vehicle heading data, and vehicle speed data when the road signs 118A-118D are identified on the roadway 116, along with the time of capture of the road signs 118A-118D. The processor 202 may be configured to obtain the vehicular trajectory data corresponding to the plurality of candidate roadwork links. In accordance with an embodiment, the sensors of the sensor unit 104C may be configured to provide sensor data to the processor 202 that indicates a location of the vehicle 114, vehicle speed data, vehicle heading data associated with the road signs, (such as, speed limit signs 118A to 118D), sign types of the road signs 118A-118D, sign values of the road signs 118A-118D along the roadway 116.

The obtained vehicular trajectory data may correspond to high resolution data in large quantity. Because of the large data size of the vehicular trajectory data, in an embodiment, the processor 202 may be further configured to sample the vehicle location data over a time period based on time of capture of the road signs 118A-118D. The processor 202 may be further configured to map-match the sampled location data on the candidate roadwork links. Because of data sampling and unpredictable driving behavior of a user associated with the vehicle 114, data noise and speed fluctuation may be present. Therefore, the vehicular trajectory data may be categorized to remove data noise and speed fluctuations.

The processor 202 may be further configured to categorize, one or more candidate roadwork links from the plurality of candidate roadwork links, into a plurality of roadwork link segments, based on at least one link attribute of each of one or more candidate roadwork links as exemplarily illustrated in FIG. 3B. The link attribute of the candidate roadwork links may include at least one of a functional class, a link start location, a link end location, or a link length. The processor 202 may be configured to divide a link length of each of the one or more candidate roadwork links into a roadwork link segment length of each of the plurality of roadwork link segments. The processor 202 may then categorize the one or more roadwork links into the plurality of roadwork link segments, based on the roadwork link segment length of each of the plurality of roadwork link segments.

The processor 202 may be configured to further determine smooth vehicle speed data corresponding to each of the plurality of roadwork link segments, based on the vehicle speed data corresponding to each of the plurality of roadwork link segments. To determine the smooth vehicle speed data corresponding to each of the plurality of roadwork link segments, the processor 202 may be further configured to validate the vehicle speed data corresponding to each of the plurality of roadwork link segments. Such validation of the vehicle speed data corresponding to each of the plurality of roadwork link segments may be based on a speed value of a last learned speed sign in a speed funnel of the one or more speed funnels that is associated with the plurality of roadwork link segments. In an exemplary embodiment, the vehicle speed data less than one third of the last learned speed sign in a speed funnel of the one or more speed funnels is invalidated because that vehicle speed data may be a wrong detection of the learned speed sign in the speed funnel and may impact negatively on the generation of the roadwork extension data.

The processor 202 may be further configured to determine free flow speed data corresponding to each of the plurality of roadwork link segments, based on the validated vehicle speed data. A free flow speed value of the free flow speed data may be less than a threshold speed value of the validated vehicle speed data. In an exemplary embodiment, the threshold speed value is 85% of the validated vehicle speed data. In accordance with an embodiment, the threshold speed value may be a closest value to the speed limit corresponding to the roadwork link segment. That is, the processor 202 may extract 85% of the validated vehicle speed data as the free flow speed data for the roadwork link segment. The processor 202 may determine the free flow speed data using the map database 106, posted speed limit signs, such as, 118A-118D, or historical speed data aggregated over several years.

The processor 202 may be further configured to determine the smooth vehicle speed data corresponding to each of the plurality of roadwork link segments, based on the free flow speed data. The processor 202 may be configured to perform a local regression and smoothing method to capture a speed trend. In accordance with an exemplary embodiment, the smoothing method may be "loess" package in R programming language. In accordance with an exemplary embodiment, degree of smoothing is from 0 to 1 and the processor 202 is configured to balance it as 0.5. The speed trends are shown in FIGS. 3C-3D for different roadwork link segment lengths.

The processor 202 may be further configured to validate the plurality of roadwork link segments based on the smooth vehicle speed data. A smooth vehicle speed value of the smooth vehicle speed data may be greater than or equal to a rated speed threshold of each of the speed funnel links. The rated speed threshold may be based on a speed threshold data, that is, a map speed (or historical map speed) and a tradeoff ratio. In accordance with an embodiment, the map speed may correspond to a maximum rated speed corresponding to the speed funnel links. The processor 202 may be further configured to compare the smooth vehicle speed value of the smooth vehicle speed data in each roadwork link segment with the maximum map speed of the speed funnel links. In accordance with an exemplary embodiment, the processor 202 may be configured to extract the qualified roadwork link segments whose smooth vehicle speed value is larger than or equal to the map speed multiplied by a tradeoff ratio as disclosed in FIG. 4A. The processor 202 may use the map speed of the one or more speed funnel links since the map speed may be inaccurate in some roadwork link segments and the maximum map speed may be a most common speed limit value, when there is no roadwork on the candidate roadwork links. The tradeoff ratio may be used to capture the locations where the vehicles, such as, the vehicle 114 start to decelerate. The processor 202 may also use the tradeoff ratio to remove data fluctuation errors from sampling of the vehicle location data over the time period. Value of the tradeoff ratio may be different in different countries. In accordance with an exemplary embodiment, the tradeoff ratio is set to 0.8.

The processor 202 may be further configured to calculate a distance between each of a plurality of pairs of consecutive validated roadwork link segments of the plurality of roadwork link segments. The processor 202 may be further configured to extract a plurality of target roadwork link segments from the plurality of validated roadwork link segments. Such extraction of the plurality of target roadwork link segments from the plurality of validated roadwork link segments may be based on the calculated distance between each of the plurality of pairs of consecutive validated roadwork link segments that is greater than a roadwork distance threshold. The processor 202 may identify the roadwork distance threshold that is, proportional to total length of the candidate roadwork links based on an identified link attribute, such as, the functional class of the candidate roadwork links.

Based on the vehicular trajectory data and the speed threshold data of the plurality of candidate roadwork links, the processor 202 may be further configured to determine at least one qualified roadwork link. Such determination of at least one qualified roadwork link may be based on the smooth vehicle speed data that is derived from the vehicular trajectory data as disclosed above. The qualified roadwork link may include two or more target roadwork link segments from the plurality of roadwork link segments. That is, the processor 202 may be configured to determine the qualified roadwork link from the plurality of candidate roadwork links.

The processor 202 may be further configured to generate the roadwork extension data based on the at least one qualified roadwork link. The processor 202 may be further configured to identify a start position of the roadwork zone 116A with a start node of a first target roadwork link segment in the plurality of target roadwork link segments. The processor 202 may be further configured to identify an end position of the roadwork zone with an end node of a second target roadwork link segment in the plurality of target roadwork link segments for generation of the roadwork extension data. The first target roadwork link segment and the second target roadwork link segment may be consecutive target roadwork link segments among the plurality of pairs of consecutive validated link roadwork segments. The calculated distance between the first target roadwork link segment and the second target roadwork link segment may be largest among the calculated distance between the pluralities of pairs of consecutive validated roadwork link segments. This is because in true roadwork zones, travel speed at both a start node of the first target roadwork link segment and an end node of the second target roadwork link segment may be close to the map speed (i.e, speed threshold data) while travel speed in the middle of roadwork zone may be much lower than the map speed.

The processor 202 may be configured to generate a map curated with one or more roadwork zones marked. The curated map may be stored in the map database 106, where the map database 106 may be used with the end user device, such as the UE 104 to provide the user with navigation features and identify the roadwork zones in advance.

FIG. 3A is a schematic diagram that illustrates a plurality of candidate roadwork links associated with a speed funnel, determined by the roadwork zone identification system 102. The plurality of candidate roadwork links comprise two upstream links 302A and 302B, three speed funnel links 304A, 304B, and 304C, and one downstream link 306A. The roadwork zone identification system 102 searches and obtains the two upstream links 302A and 302B from the start node of the first speed funnel link 304A based on the upstream heading of the first speed funnel link 304A and the downstream heading of the upstream link 302B and a threshold distance, for example, 1.5 km from the start node of the first speed funnel link 304A. Similarly, the roadwork zone identification system 102 searches and obtains the downstream link 306A from an end node of the last speed funnel link 304C based on the downstream heading of the last speed funnel link 304C and the upstream heading of the downstream link 306A and a threshold distance, for example, 1.5 km from the end node of the last speed funnel link 304C.

In accordance with an exemplary embodiment, the roadwork zone identification system 102 may be configured to search 1.5 km downstream of the last speed funnel link 304C and include an extended link of 1.5 km, that is, the downstream link 306A in the candidate roadwork links. In accordance with an exemplary embodiment, the roadwork zone identification system 102 may be configured to search 1.5 km upstream of the first speed funnel link 304A and include the extended links of 1.5 km, that is, the upstream links 302A and 302B in the candidate roadwork links. The inclusion of the downstream link 306A and the upstream links 302A and 302B in the candidate roadwork links is because speed change of the vehicle may be ahead of a speed funnel.

FIG. 3B illustrates a schematic diagram for categorizing the candidate roadwork links by the roadwork zone identification system 102, into roadwork link segments.

From the determined plurality of candidate roadwork links similar to as shown in FIG. 3A, the roadwork zone identification system 102 may be configured to extract all the vehicular trajectory data map-matched on the candidate roadwork links. Because of the data sampling and unpredictable driving behavior, travel speed of the vehicles, such as the vehicle 114 may fluctuate along the plurality of candidate roadwork links. Even though, in some roadwork zones, a clear speed reduction and recovery may be seen. The roadwork zone identification system 102 may be configured to categorize, one or more candidate roadwork links from the plurality of candidate roadwork links, into a plurality of roadwork link segments. Such categorization may be based on the at least one link attribute, that is, the link length of each of the one or more candidate roadwork links.

With reference to FIG. 3B, two methods are exemplarily illustrated for categorization of the candidate roadwork links, namely link 1 and link 2, viz., method 1 and method 2. The link length of link 1 is 165 meters and the link length of link 2 is 284 meters.

The roadwork zone identification system 102 may be configured to divide a link length of each of the candidate roadwork links into a roadwork link segment length of each of the plurality of roadwork link segments. The link length may be determined based on whether original vehicular trajectory data or sampled vehicular trajectory data is used. In accordance with an exemplary embodiment, the roadwork zone identification system 102 is configured to divide link 1 and link 2 into roadwork link segments of roadwork link segment length of 10 meters each, based on the original vehicular trajectory data or into roadwork link segments of roadwork link segment length of 100 meters each based on the sampled vehicular trajectory data. Further, both in method 1 and method 2, the candidate roadwork links link 1 and link 2 are categorized into roadwork link segments of roadwork link segment length of 100 meters. In method 1, for a link length of each of the candidate roadwork links that may not be wholly divisible by 100 meters, the roadwork zone identification system 102 may be configured to round up in each of the candidate roadwork links. That is, as exemplarily illustrated, the link 1 is categorized into two roadwork link segments since the link length of link 1 is 165 meters. The first roadwork link segment in link 1 if of roadwork segment length 100 meters and the second roadwork link segment in link 1 is of roadwork segment length 65 meters. Similarly, the link 2 is categorized into three roadwork link segments of roadwork segment lengths of 200 meters, 200 meters, and 84 meters respectively, since the link length of link 2 is 284 meters. In method 2, for the total link lengths of the candidate roadwork links that may not be wholly divisible by 100 meters, the roadwork zone identification system 102 may be configured to round up in a last roadwork link segment of the candidate roadwork links. That is, as exemplarily illustrated, the total link lengths of the candidate roadwork links link 1 and link 2 is 165+284 is 449 meters. The candidate roadwork links link 1 and link 2 are categorized into 4 roadwork link segments of 100 meters each and the last roadwork link segment is rounded to 49 meters.

Therefore, the categorization of one or more candidate roadwork links into the plurality of roadwork link segments may diminish the underlying data noise and speed fluctuation that constitutes the vehicular trajectory data that may further aid in accurate determination of the roadwork extension data. The roadwork zone identification system 102 may be configured to generate smooth vehicle speed data of each of the roadwork link segments.

FIGS. 3C-3D exemplarily illustrate graphical representations of trends in vehicle speed data, free flow speed data, and smooth vehicle speed data corresponding to the roadwork link segments of the candidate roadwork links. In FIG. 3C, each of the road work link segments is of the roadwork link segment length 10 meters as described in FIG. 3B. In FIG. 3D, each of the road work link segments is of the roadwork link segment length 100 meters as sampled vehicle location data is used as described in FIG. 3B. The roadwork zone identification system 102 eliminates the vehicle speed data where the vehicle speed data for each of the roadwork link segments is determined to be lower than one-third of speed limit value of the last learned speed sign of the associated speed funnel links in the candidate roadwork links, and obtains validated vehicle speed data. For each roadwork link segment, the roadwork zone identification system 102 extracts 85% of the validated vehicle speed data as free flow speed data corresponding to each of the roadwork link segments. The roadwork zone identification system 102 further determines smooth vehicle speed data by applying smoothing techniques, such as, local regression and smoothing in R programming language on the free flow speed data corresponding to each of the roadwork link segments. The degree of smoothing is from 0 to 1 and the roadwork zone identification system 102 is configured to balance it as 0.5.

With reference to FIG. 3C, dotted pattern shows the original vehicle speed data, lined pattern shows the free flow speed data and the continuous line shows the smooth vehicle speed data. In FIG. 3D, the dotted pattern shows the vehicle speed data corresponding to the sampled vehicle location data, lined pattern shows the free flow speed data and the continuous line shows the smooth vehicle speed data. Y axis in the graphical representation shows speed data associated with the roadwork link segments in kmph. In FIG. 3C, X-axis shows the roadwork extension (in meters) from the start of the speed funnel and in FIG. 3D, the X-axis shows the roadwork extension (in meters) 1.5 km from the start of the speed funnel. That is, FIG. 3D shows the trends in the speed data on considering the upstream links in the upstream of the speed funnel links while FIG. 3C shows the trends in the speed data on omitting the upstream links in the upstream of the speed funnel links. In FIG. 3C, the lined pattern of the free flow speed data shows a fluctuation while the smooth vehicle speed data has very less fluctuation as compared to the lined pattern of free flow speed data. The vehicle speed data represented in FIG. 3D has much more fluctuation the original speed data in FIG. 3C due to the increase in the roadwork link segment length from 10 meters to 100 meters. The segmentation and smoothing of the vehicle speed data also reveals trend in FIG. 3D, however, the trends of speeds is clearer in FIG. 3C.

FIG. 4A exemplarily illustrates a tabular representation of the smooth vehicle speed data and the rated speed threshold for extracting a plurality of target roadwork link segments by the roadwork zone identification system 102. With reference to FIG. 4A, it is considered that there are four candidate roadwork links, viz., link 1, link 2, link 3, and link 4. The roadwork zone identification system 102 categorizes the candidate roadwork links to ten roadwork link segments, viz., link segment 1, link segment 2, link segment 3, . . . , and link segment 10 as exemplarily illustrated. The maximum map speed, that is, the speed threshold data for the roadwork link segments is assumed to be 120 kmph and the tradeoff ratio is taken as 0.85 to obtain the rated speed threshold of 120*0.85=102 kmph. The tradeoff ratio may be used to capture the locations where the vehicles, such as, the vehicle 114 starts to decelerate. The roadwork zone identification system 102 may also use the tradeoff ratio to remove data fluctuation errors from sampling of the vehicle location data. The length of each roadwork link segment is 100 meters.

The roadwork zone identification system 102 may be configured to compare the smooth vehicle speed data for each roadwork link segment link segment 1 to link segment 10 with the rated speed threshold for each roadwork link segment link segment 1 to link segment 10. The roadwork zone identification system 102 obtains validated roadwork link segments link segment 1, link segment 2, link segment 8, and link segment 10 where the smooth vehicle speed value of the smooth vehicle speed data is greater than or equal to the rated speed threshold.

The roadwork zone identification system 102 may be further configured to calculate a distance between each of a plurality of pairs of consecutive validated roadwork link segments. Therefore, the roadwork zone identification system 102 calculates a distance between link segment 1 and link segment 2, link segment 2 and link segment 8, and link segment 8 and link segment 10 as 100 meters, 600 meters, and 200 meters as exemplarily illustrated, using the roadwork link segment length 100 meters of each of the roadwork link segments. Therefore, the largest distance (600 meters) is between link segment 2 and link segment 8. The roadwork zone identification system 102 may be configured to extract a plurality of target roadwork link segments from the plurality of validated roadwork link segments, based on the calculated distance between link segment 2 and link segment 8 being greater than a roadwork distance threshold. The roadwork zone identification system 102 determines the roadwork extension as the largest distance, that is, 600 meters between two consecutive validated roadwork link segments link segment 2 and link segment 8.

FIG. 4B exemplarily illustrate a graphical representation of trends in vehicle speed data, free flow speed data, and smooth vehicle speed data corresponding to the roadwork link segments link segment 1 to link segment 10 of the candidate roadwork links to identify a qualified roadwork zone. In FIG. 4B, the dotted pattern shows vehicle speed data corresponding to the sampled vehicle location data, lined pattern shows the free flow speed data, and the continuous line shows the smooth vehicle speed data. The target roadwork link segments link segment 2 and link segment 8 are identified in FIG. 4B. X axis shows the roadwork extension from the start of the speed funnel (in meters) and Y axis shows speed in kmph. The roadwork zone identification system 102 determines the qualified roadwork links comprising the roadwork link segments link segment 2 to link segment 8 as the roadwork link based on the calculated distance between the target roadwork link segment 2 and the target roadwork link segment 8 being greater than the roadwork distance threshold. The roadwork zone identification system 102 determines the roadwork extension 402 as the largest distance between two consecutive validated roadwork link segments. The trend in the smooth vehicle speed data between the target roadwork link segment 2 and the target roadwork link segment 8 shows a decrease in the smooth vehicle speed data from the start node of the target roadwork link segment 2 and increase in the smooth vehicle speed data after the end node of the target roadwork link segment 8. The trend in the smooth vehicle speed data represents a speed concave. Initially, the smooth vehicle speed value starts decreasing before the start of the roadwork zone and then, gradually the smooth vehicle speed value starts increasing after the end of the roadwork zone. The roadwork zone identification system 102 generates the roadwork extension data based on the start position and the end position of the roadwork zone 116A. Such pattern in the smooth vehicle speed indicates presence of a qualified roadwork zone 116A between the target roadwork link segment 2 and the target roadwork link segment 8.

FIGS. 5A-5C exemplarily illustrate graphical representations of trends in vehicle speed data, free flow speed data, and smooth vehicle speed data corresponding to the roadwork link segments of the candidate roadwork links to identify qualified roadwork zone and disqualified roadwork zones. In FIGS. 5A-5C, the dotted pattern shows vehicle speed data corresponding to the sampled vehicle location data, lined pattern shows the free flow speed data, and the continuous line shows the smooth vehicle speed data. The target roadwork link segments link segments are also identified in FIGS. 5A-5C. X-axis shows the roadwork extension 1500 meters from the start of the speed funnel (in meters) and Y axis shows speed in kmph. FIG. 5A exemplarily illustrates a disqualified roadwork zone as all the roadwork link segments are target roadwork link segments.

FIG. 5B shows an example of a disqualified roadwork zone where all the target roadwork link segments are on one side of the speed concave (at the start). The target roadwork link segment shows that the smooth vehicle speed value is greater than the rated speed threshold. The roadwork link segments at the end of the graph are not validated roadwork link segments because the smooth vehicle speed value is less than the rated speed threshold. In certain scenarios, this type of speed trend may show that the speed funnel is at a beginning or end of a highway where the roadway is merged with an urban road. In some other scenario, the speed trend may reflect a high curvature road. However, such speed trend identifies a disqualified roadwork zone.

FIG. 5C shows an example of disqualified roadwork zone where there are no target roadwork link segments since there are no validated roadwork link segments. In certain scenarios, this type of speed trend may show that an accident has happened on the roadway. In some other scenario, there may be a road closure on certain day because of some event nearby. In some other scenario, there may be icing on the road because of bad weather. However, such speed trend identifies a disqualified roadwork zone.

FIGS. 6A-6B collectively illustrate a flowchart 600 for implementation of an exemplary method to generate roadwork extension data of a roadwork zone, in accordance with an embodiment of the disclosure. The method, in accordance with the flowchart 600, may be executed by the roadwork zone identification system 102. The method starts at 602 and proceeds to 604.

At 604, speed funnel data of one or more speed funnels may be obtained from the map database 106. The speed funnel data may correspond to one or more speed funnel links associated with the one or more speed funnels. Each of the one or more speed funnels may include at least two different learned speed signs. At 606, the one or more downstream links may be searched in downstream of a last speed funnel link of the one or more speed funnel links and the one or more upstream links may be searched in upstream of a first speed funnel link of the one or more speed funnel links. At 608, a plurality of candidate roadwork links comprising the one or more downstream links, the one or more speed funnel links, and the one or more upstream links may be determined. At 610, vehicular trajectory data corresponding to the plurality of candidate roadwork links may be obtained from the sensor unit 104C of the UE associated with the vehicle 114. The vehicular trajectory data may include vehicle speed data, vehicle location data, and vehicle heading data.

At 612, the vehicle location data may be sampled over a time period. In accordance with an embodiment, a random sampling of the vehicle location data may be performed. At 614, the sampled location data may be map-matched to the plurality of roadwork links. At 616, one or more candidate roadwork links from the plurality of candidate roadwork links may be categorized into a plurality of roadwork link segments as disclosed in the detailed description of FIG. 2. At 618, vehicle speed data corresponding to each of the plurality of roadwork link segments may be validated. At 620, free flow speed data corresponding to each of the plurality of roadwork link segments may be determined. At 622, smooth vehicle speed data corresponding to each of the plurality of roadwork link segments, may be determined, based on the free flow speed data. At 624, the plurality of roadwork link segments may be validated as disclosed in the detailed description of FIG. 2. At 626, a distance may be calculated between each of a plurality of pairs of consecutive validated roadwork link segments of the plurality of roadwork link segments.

At 628, a plurality of target roadwork link segments may be extracted from the plurality of validated roadwork link segments. Such extraction of the plurality of target roadwork link segments from the plurality of validated roadwork link segments may be based on the calculated distance between each of the plurality of pairs of consecutive validated roadwork link segments that is greater than a roadwork distance threshold and at 630, at least one qualified roadwork link may be determined. The at least one qualified roadwork link may include two or more roadwork link segments from the plurality of roadwork link segments.

At 632, a start position of the roadwork zone may be identified, with a start node of a first target roadwork link segment in the plurality of target roadwork link segments for generation of the roadwork extension data. At 634, an end position of the roadwork zone may be identified, with an end node of a second target roadwork link segment in the plurality of target roadwork link segments. The first target roadwork link segment and the second target roadwork link segment may be consecutive target roadwork link segments among the plurality of pairs of consecutive validated roadwork link segments. The calculated distance between the first target roadwork link segment and the second target roadwork link segment may be largest among the calculated distance between the pluralities of pairs of consecutive validated roadwork link segments.

At 636, the roadwork extension data may be generated. Accordingly, the I/O interface may communicate with the user interface 104B of UE 104 to assist a user associated with the UE 104 with the notifications on the upcoming roadwork zone 116A, such as through navigation assistance data. The different representations of the navigation suggestions may be in the form of a map with color coded or patterned road links indicating roadwork zone 116A on a roadway 116. The control passes to the end 638.

It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram 600, may be implemented by special purpose hardware-based computer systems which perform the specified functions, or combinations of special purpose hardware and computer instructions.

On implementing the method 600 disclosed herein, the end result generated by the roadwork zone identification system 102 is a tangible determination of roadwork extension data for identifying location and extent of one or more roadwork zones. Roadwork zones are preceded by lane markings or speed limit signs constituting a speed funnel. The determination of the extent of the roadwork zone along with the route through the roadwork zone aids in smooth and well planned navigation of vehicles through the roadwork zones. The determination of the roadwork extension data prior to navigation of an autonomous vehicle through the roadwork zone aids the autonomous vehicles in transitioning from an autonomous mode to a manual mode smoothly. In a roadwork zone, operating the autonomous vehicle in the manual mode is preferred to avoid any undue mishaps or collisions from taking place. In the process of determination of one or more routes through a roadwork zone, the roadwork zone identification system 102 may overcome the shortcomings of the point based road sign observations and failure in detection of some lane markings by determining connectivity between map-matched links generated from the obtained speed funnel data. The determination of the route through the roadwork zone may be based on vehicular trajectory data and speed threshold data.

Example embodiments disclosed herein provide an improvement in navigation technology related to roadwork zones as follows: The roadwork zone may have numerous people working with heavy machinery. The roadwork zone may lead to a blockage on the road and may result in diversions or merging of the lanes of the road. A prior determination of an extent of a roadwork zone to a vehicle may avoid any accident from taking place at the roadwork zone due to plying vehicles and also saves travel time of users plying via the roadwork zone. Planned navigation of vehicles through the roadwork zone on one of the routes through the roadwork zone may allow authorities to plan and manage movement of the heavy machinery at the roadwork zone to avoid mishaps. The roadwork zone identification system 102 may use road sign observations generated from the vehicles plying via a roadwork zone and may map-match the lane marking observations. The roadwork zone identification system 102 may obtain sensor data as disclosed in FIG. 1 from the vehicles on a day. Thus embodiments of the present invention result in lesser processing thereby leading to low resource utilization for solving a problem deeply rooted in navigation technology, autonomous vehicles, and vehicular safety. The determined routes through the roadwork zones may be stored in the map database 106 to aid in navigation of the vehicles through the roadwork zone until the roadwork takes place. The determined routes through the roadwork zones stored in the map database 106 may constitute historic data for the authorities to plan roadwork in the future. The roadwork zone identification system 102, in an embodiment, may generate recommendations on different modes of transport preferable to avoid traffic on the determined routes in the roadwork zone.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating roadwork extension data of a roadwork zone, the system comprising:
   at least one memory configured to store computer program code instructions; and
   at least one processor configured to execute the computer program code instructions to:
   obtain speed funnel data of one or more speed funnels;
   determine a plurality of candidate roadwork links, based on the speed funnel data;
   obtain vehicular trajectory data corresponding to the plurality of candidate roadwork links;
   determine at least one qualified roadwork link from the plurality of candidate roadwork links, based on the vehicular trajectory data and speed threshold data of the plurality of candidate roadwork links; and
   generate the roadwork extension data based on the at least one qualified roadwork link,
   wherein the vehicular trajectory data comprises vehicle speed data, vehicle location data, and vehicle heading data.

2. The system of claim 1, wherein the speed funnel data corresponds to one or more speed funnel links associated with the one or more speed funnels, and wherein each of the one or more speed funnels comprises at least two different learned speed signs.

3. The system of claim 2, wherein the speed threshold data indicate a historical map speed of the plurality of candidate roadwork links, the speed funnel links, or a combination thereof.

4. The system of claim 2,
   wherein the at least one processor is further configured to search for one or more downstream links in downstream of a last speed funnel link of the one or more speed funnel links and one or more upstream links in upstream of a first speed funnel link of the one or more speed funnel links to determine the plurality of the candidate roadwork links, and
   wherein the plurality of candidate roadwork links comprise the one or more downstream links, the one or more speed funnel links, and the one or more upstream links.

5. The system of claim 2,
   wherein the vehicular trajectory data comprises vehicle location data; and
   wherein the at least one processor is further configured to:
   sample the vehicle location data over a time period; and
   map-match the sampled location data to the plurality of candidate roadwork links.

6. The system of claim 1, wherein the at least one processor is configured to:
   identify at least one link attribute and a roadwork distance threshold, associated with the at least one qualified roadwork link; and
   generate the roadwork extension data, based on the at least one link attribute and the roadwork distance threshold.

7. The system of claim 6, wherein the at least one link attribute is at least one of a functional class, a link start location, a link end location, or a link length.

8. The system of claim 7,
   wherein the vehicular trajectory data comprises vehicle speed data, and
   wherein the at least one processor is further configured to:
   categorize, one or more candidate roadwork links from the plurality of candidate roadwork links, into a plurality of roadwork link segments, based on the at least one link attribute of each of the one or more candidate roadwork links;
   determine smooth vehicle speed data corresponding to each of the plurality of roadwork link segments, based on the vehicle speed data corresponding to each of the plurality of roadwork link segments; and
   determine the at least one qualified roadwork link, based on the smooth vehicle speed data, wherein the at least one qualified roadwork link comprises two or more roadwork link segments from the plurality of roadwork link segments.

9. The system of claim 8, wherein the at least one processor is further configured to:
   divide a link length of each of the one or more candidate roadwork links into a roadwork link segment length of each of the plurality of roadwork link segments; and
   categorize the one or more candidate roadwork links into the plurality of roadwork link segments, based on the roadwork link segment length of each of the plurality of roadwork link segments.

10. The system of claim 8, wherein to determine the smooth vehicle speed data the at least one processor is further configured to:
    validate the vehicle speed data corresponding to each of the plurality of roadwork link segments, based on a speed value of a last learned speed sign in a speed funnel of the one or more speed funnels that is associated with the plurality of roadwork link segments;
    determine free flow speed data corresponding to each of the plurality of roadwork link segments, based on the validated vehicle speed data, wherein a free flow speed value of the free flow speed data is less than a threshold speed value of the validated vehicle speed data; and
    determine the smooth vehicle speed data corresponding to each of the plurality of roadwork link segments, based on the free flow speed data.

11. The system of claim 10, wherein the at least one processor is further configured to:
    validate the plurality of roadwork link segments based on the smooth vehicle speed data,
    wherein a smooth vehicle speed value of the smooth vehicle speed data is greater than or equal to a rated speed threshold of each of the one or more speed funnel links, and
    wherein the rated speed threshold is based on a tradeoff ratio;
    calculate a distance between each of a plurality of pairs of consecutive validated roadwork link segments of the plurality of roadwork link segments; and
    extract a plurality of target roadwork link segments from the plurality of validated roadwork link segments, based on the calculated distance between each of the plurality of pairs of consecutive validated roadwork link segments that is greater than the roadwork distance threshold.

12. The system of claim 11, wherein the at least one processor is further configured to:
    identify a start position of the roadwork zone with a start node of a first target roadwork link segment in the plurality of target roadwork link segments;
    identify an end position of the roadwork zone with an end node of a second target roadwork link segment in the plurality of target roadwork link segments,
    wherein the first target roadwork link segment and the second target roadwork link segment are consecutive target roadwork link segments among the plurality of pairs of consecutive validated roadwork link segments, and wherein the calculated distance between the first target roadwork link segment and the second target roadwork link segment is largest among the calculated distance between the plurality of pairs of consecutive validated roadwork link segments; and generate the roadwork extension data of the roadwork zone, based on the identified start position and the identified end position of the roadwork extension.

13. A computer programmable product comprising a non-transitory computer readable medium having stored thereon computer executable instructions, which when executed by one or more processors, cause the one or more processors to carry out operations for generating roadwork extension data of a roadwork zone, the operations comprising:

obtaining, by one or more processors, speed funnel data of one or more speed funnels;

determining, by the one or more processors, a plurality of candidate roadwork links, based on the speed funnel data;

obtaining, by the one or more processors, vehicular trajectory data corresponding to the plurality of candidate roadwork links;

determining, by the one or more processors, at least one qualified roadwork link from the plurality of candidate roadwork links, based on the vehicular trajectory data and speed threshold data of the plurality of candidate roadwork links; and generating, by the one or more processors, the roadwork extension data based on the at least one qualified roadwork link, wherein the vehicular trajectory data comprises vehicle speed data, vehicle location data, and vehicle heading data.

14. A method for generating roadwork extension data of a roadwork zone, the method comprising:

obtaining, by one or more processors, speed funnel data of one or more speed funnels;

determining, by the one or more processors, a plurality of candidate roadwork links, based on the speed funnel data;

obtaining, by the one or more processors, vehicular trajectory data corresponding to the plurality of candidate roadwork links;

determining, by the one or more processors, at least one qualified roadwork link from the plurality of candidate roadwork links, based on the vehicular trajectory data and speed threshold data of the plurality of candidate roadwork links; and generating, by the one or more processors, the roadwork extension data based on the at least one qualified roadwork link, wherein the vehicular trajectory data comprises vehicle speed data, vehicle location data, and vehicle heading data.

15. The method of claim 14, wherein the speed funnel data corresponds to one or more speed funnel links associated with the one or more speed funnels.

16. The method of claim 15, wherein each of the one or more speed funnels comprises at least two different learned speed signs.

17. The method of claim 14, wherein the vehicular trajectory data comprises vehicle location data, and wherein the method further comprises:

sample the vehicle location data over a time period; and map-match the sampled location data to the plurality of candidate roadwork links.

18. The method of claim 17, further comprising:

searching for one or more downstream links in downstream of a last speed funnel link of the one or more speed funnel links and one or more upstream links in upstream of a first speed funnel link of the one or more speed funnel links to determine the plurality of the candidate roadwork links, and wherein the plurality of candidate roadwork links comprise the one or more downstream links, the one or more speed funnel links, and the one or more upstream links.

* * * * *